(12) United States Patent
Israr

(10) Patent No.: US 10,942,572 B1
(45) Date of Patent: Mar. 9, 2021

(54) SYSTEMS, METHODS, AND ARTICLES USING POLARIZABLE MEDIA IN HAPTIC-JAMMING

(71) Applicant: Facebook Technologies, LLC, Menlo Park, CA (US)

(72) Inventor: Ali Israr, Bothell, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 4 days.

(21) Appl. No.: 16/273,368

(22) Filed: Feb. 12, 2019

(51) Int. Cl.
*G06F 3/01* (2006.01)
*G02B 27/01* (2006.01)

(52) U.S. Cl.
CPC ........... *G06F 3/016* (2013.01); *G02B 27/017* (2013.01); *G06F 3/014* (2013.01)

(58) Field of Classification Search
CPC ........ G06F 3/016; G06F 3/014; G02B 27/017
See application file for complete search history.

(56) References Cited

U.S. PATENT DOCUMENTS

| 6,110,130 | A | * | 8/2000 | Kramer | A61B 5/1071 600/587 |
| 9,468,847 | B2 | * | 10/2016 | Bekri | A63F 13/285 |
| 2019/0339773 | A1 | * | 11/2019 | Holbery | G06F 3/014 |

* cited by examiner

*Primary Examiner* — Afroza Chowdhury
(74) *Attorney, Agent, or Firm* — FisherBroyles, LLP

(57) ABSTRACT

A haptic-jamming device may include (1) a first haptic-jamming member having a polarizable first element rotatable about an axis and a first elongated extension outwardly disposed from the first element in a first direction, (2) a second haptic-jamming member having a second element rotatable about the axis and a second elongated extension outwardly disposed from the second element in a second direction, and (3) a variable voltage source for at least one of the first haptic-jamming member or the second haptic-jamming member that, when energized, generates an electrostatic field encompassing at least one of the first or second elements. A level of separation of the first and second elements may be related to a strength of the electrostatic field. Various other methods, systems, and wearable articles are also disclosed.

20 Claims, 13 Drawing Sheets

SYSTEMS, METHODS, AND ARTICLES USING POLARIZABLE MEDIA IN HAPTIC-JAMMING

BACKGROUND

In augmented and/or virtual reality (AR/VR) equipment, haptic feedback may be an important aspect in their design. Such feedback allows a user to sense the feel, touch, and pressure exerted by objects in a virtual environment. In a real situation, how an object feels when gripped by a pair of fingers, or a hand, is important aspect in being able to manipulate that object properly. In AR/VR situations, the haptic environment may allow precise control over the manipulation of an object using, for example, a glove or a dexterous gripper.

The consequences of remote actions or manipulations of physical objects may be addressed at an interactive tactile level, for example, through a glove or other article worn by a user. Such an article may be remotely connected to an equivalent system (e.g., a mechanical system). Often, a remote system may be located within an environment that would not permit a human to exist easily, such as in space, underwater, extreme heat, extreme cold, or even one of excessive radioactivity. In some situations, the ability of a glove-wearing user to have control over manipulation of objects and to receive feedback may be critical to a successful operation occurring at the remote site. One aspect of this feedback may relate to how an amount of resistance or force that a remote gripper is receiving during manipulation is transmitted to the user's glove (e.g., providing a resistance or stiffness that correlates to the amount of force that the remote gripper is sensing). Unfortunately, conventional haptic-feedback devices are often limited in their ability to provide realistic feedback to users. Such haptic-feedback devices may be limited, for example, in their degree of precision, variability, and versatility. Therefore, improved haptic-feedback devices, systems, and methods are needed to improve user experiences with artificial- and virtual reality environments.

SUMMARY

As will be described in greater detail below, the instant disclosure describes embodiments in which polarizable media via electrostatic and/or electro-mechanical means are used to mitigate the movements between one or more joints of a user. As will be described in greater detail below, the instant disclosure describes various articles of apparel, systems, and methods to provide electrostatic and/or electro-mechanical haptic-jamming using polarizable media in haptic devices. In one example, a haptic-jamming device may include (1) a first haptic-jamming member having a polarizable first element rotatable about an axis and a first elongated extension outwardly disposed from the first element in a first direction, (2) a second haptic-jamming member including a second element rotatable about the axis and a second elongated extension outwardly disposed from the second element in a second direction, and (3) a variable voltage source electrically coupled to at least one of the first haptic-jamming member or the second haptic-jamming member that, when energized, generates an electrostatic field encompassing at least one of the first or second elements, wherein a level of resistance to movement between the first and second elements is related to a strength of the electrostatic field.

According to some embodiments, the second element may be polarizable and at least one of the polarizable first or second elements may include a piezoelectric material. In one example, at least one of the first element or the second element may include a dielectric material disposed between two electrodes, the electrodes connected to the voltage source. A voltage from the variable voltage may be varied by a pulse-width modulation signal to vary the strength of the electrostatic field. In some examples, the axis may be positioned to be located at a bodily joint of a user. The bodily joint may include a carpometacarpal joint, a metacarpal joint, a proximal interphalangeal joint, or a distal interphalangeal joint.

In various embodiments, the first elongated extension may be positioned such that the first direction is oriented along a digit phalanx of a user. Additionally, the second haptic-jamming member may be positioned such that the second direction is oriented along an adjacent digit phalanx of the user. In some examples, the first elongated extension may be positioned to be moveably disposed parallel to the digit phalanx and the second elongated extension may be positioned to be moveably disposed parallel to the adjacent digit phalanx in relation to the electrostatic field. In at least one embodiment, a composite device to control the movements of a hand may include a haptic-jamming device positioned to be located adjacent at least one of a carpometacarpal joint, a metacarpal joint, a proximal interphalangeal joint, or a distal interphalangeal joint of a user. The voltage source of the haptic-jamming device may be varied by a pulse-width modulation signal specific to the at least one of the carpometacarpal joint, the metacarpal joint, the proximal interphalangeal joint, or the distal interphalangeal joint.

A related method for providing haptic feedback to a user may include (1) generating, by a variable voltage source, an electrostatic field encompassing at least one of a polarizable first element of a first haptic-jamming member or a second element of a second haptic-jamming member, and (2) controlling a level of resistance to movement between the first element of the first haptic-jamming member and the second element of the second haptic-jamming member by controlling a strength of the generated electrostatic field encompassing the at least one of the first element or the second element. The first haptic-jamming member may include the first element rotatable about an axis and a first elongated extension outwardly disposed in a first direction from the first element. Additionally, the second haptic-jamming member may include the second element rotatable about the axis and a second elongated extension outwardly disposed in a second direction from the second element.

According to various embodiments, a wearable haptic article (e.g., a glove) dimensioned to be worn on a user may include (1) a haptic-jamming device that abuts a portion of a joint of a user when the wearable article is worn by the user, and (2) a variable voltage source that applies a voltage using pulse-width modulation to the haptic-jamming device to generate an electrostatic field encompassing at least one of the first or second elements to control a level of resistance felt by the user upon moving or attempting to move the joint.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1A:
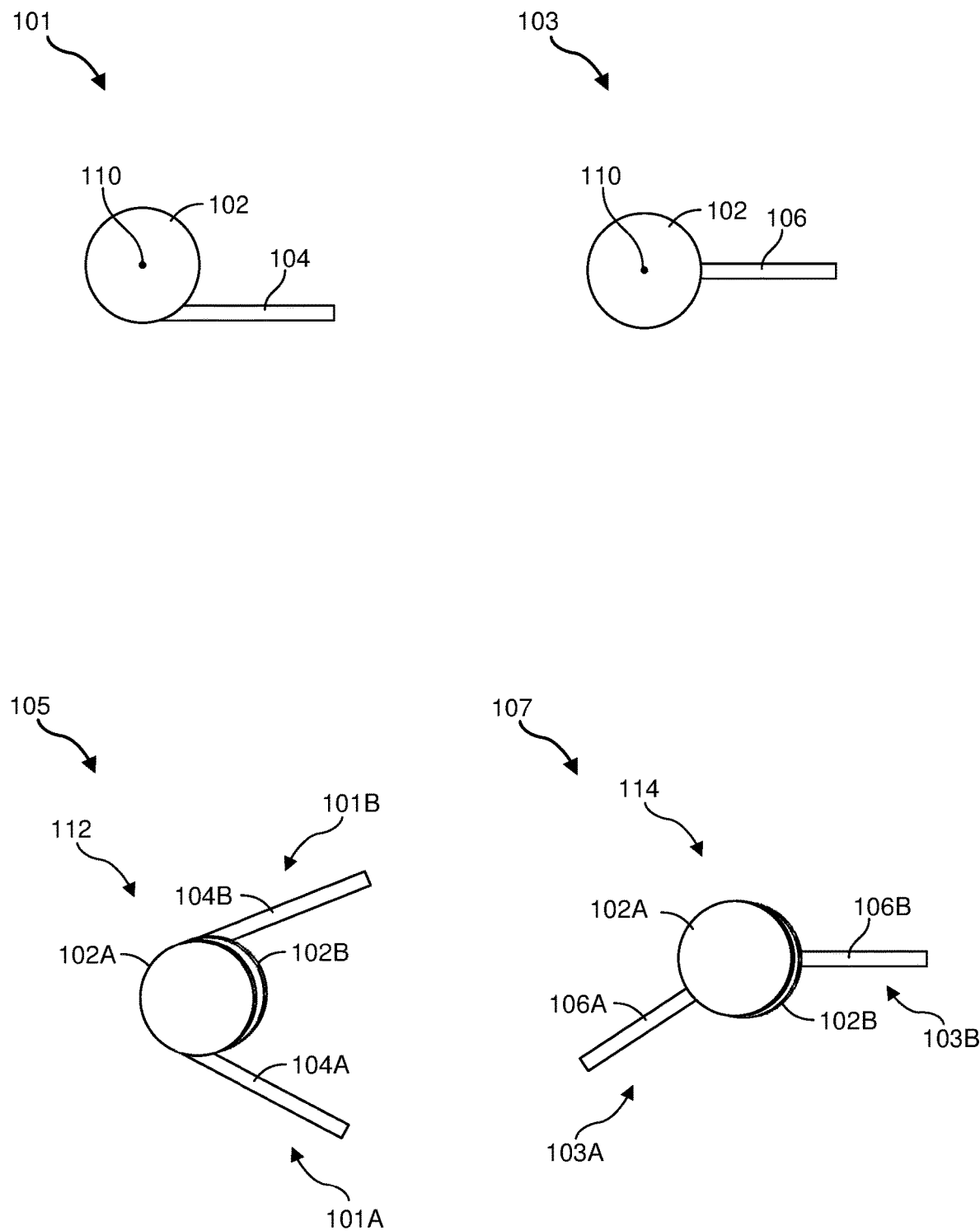
FIG. 1A depicts top views of exemplary haptic-jamming members and devices, in accordance with some of the embodiments described in the present application.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods, as well as haptic-jamming members, devices, and articles that may include or be utilized in conjunction these systems and methods. As will be explained in greater detail below, embodiments of the instant disclosure may, by utilizing polarizable media, electrostatic attraction and/or repulsion, or electro-mechanical phenomena, such as that present in piezoelectric materials, allow the ability to provide resistances to movements of one or more hand digits and/or joints of a user. Other joints of a user that may be applicable to the haptic-jamming techniques disclosed herein may include neck, knee, hip, elbow, shoulder, ankle, and any of the digits of a foot.

In a virtual environment, control over the feel of an object to a user may be performed by sensors in a haptic article, such as a glove worn by the user. Additionally, haptic feedback may be provided via a response the user senses when manipulating a virtual object while wearing that glove. In some embodiments, a contribution to this control may be provided by haptic-jamming devices. Traditional haptic-jamming methodologies may use a variety of physical techniques to induce stiffness, such as techniques that adjust hydraulic or pneumatic pressure so as to limit the movement of a joint in a desired matter. In contrast, embodiments described herein may utilize wearable devices that include polarizable media to jam or allow movement of one or more of the user's joints. Such wearable devices be more lightweight that conventional devices and may possess a degree of flexibility that does not hinder user movements or control that may affect haptic feedback.

The following will provide, with reference to FIGS. 1-4, detailed descriptions of basic haptic-jamming members that, when combined, form a haptic-jamming device. Various embodiments may use polarizable media and/or electrostatic forces controlling the behavior of electrostatic devices, polymers, or layers to mitigate the level of frictional forces by altering the physical separation of opposing elements within a haptic-jamming device. Such a separation may be accomplished by polarization or electrostatic forces. Alternative or additional embodiments may use electro-mechanical systems or methods to provide haptic-jamming. Some examples may use a combination of electrostatic, electro-active, and/or electro-mechanical phenomena to alter (i.e., increase or decrease) the frictional forces encountered between opposing element elements. The description corresponding to FIG. 5 is directed to a system that utilizes exemplary haptic-jamming devices to provide resistance to movements in one or more joints of a finger of a user. In at least one example, the level of resistance may depend on the strength of the polarization or electrostatic forces generated (i.e., the potential difference between electrodes or contact surfaces). The resistances so generated may provide an appropriate mitigative resistance of the movement of the angle between, e.g., two adjacent phalanges of a digit.

Figure 6:
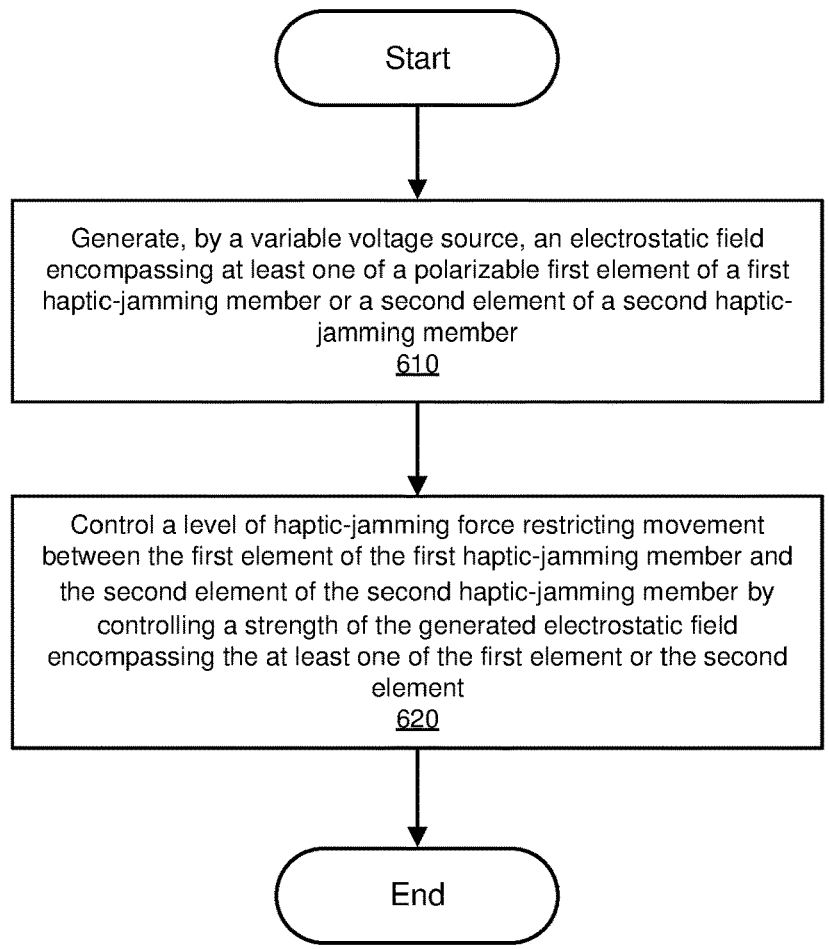
FIG. 6 presents a flow diagram of an exemplary method for electrostatic/electro-mechanical haptic-jamming, in accordance with some of the embodiments described in the present application.

FIG. 6 presents an exemplary method that may provide movement resistances to one or more joints of a user. The resistances, generated by frictional forces between surfaces or layers within a haptic-jamming device, may be mitigated by a level of electrostatic field that has been generated between the surfaces or layers.

According to some embodiments, one or more haptic-jamming devices may be included in a wearable article, such as a haptic glove dimensioned to be worn on a user's hand and/or at least one digit thereof. The wearable article may include one or more haptic-jamming devices that abut a portion of the user's hand when the wearable article is worn by the user. The haptic-jamming device may be a force application mechanism that exerts a force, in response to an external control, against the portion of the user's hand via a haptic feedback system to provide a sensation to the user of contact with an object surface by the portion of the user's hand when the wearable article is worn by the user. In various examples, the haptic-jamming device may have more than two haptic-jamming members.

In various embodiments, a computing subsystem may classify or manage the shape of the voltage pulses that control the amount and/or duration of frictional forces generated between opposing surface. Pulse-width modulation may be one approach to controlling voltage pulses supplied to one or more haptic-jamming devices described in the present application.

In the present application, a polymer material may be used in one or more of the described embodiments. Such a polymer material may be electroactive, conductive, and/or semi-conductive, or may alternatively be a dielectric material that acts as an insulator. If the polymer material is substantially incompressible, then the volume of the polymer material may remain constant or substantially constant. For example, the surface area (A) that is in contact with a surface (e.g., a conductor) and the thickness (z) may define the volume of such a polymer material, and moreover, it may be readily seen that the relative change of thickness is anticorrelated to the relative change in area. Alternatively, if the polymer is compressible, then the volume of the polymer material may change during, for example, forced compression between two opposed surfaces abutting the polymer material.

Assuming that the polymer, in some embodiments, is incompressible, then any change in thickness z and/or surface area A may convert electrical energy into mechanical energy. It is this mechanical energy that may create the appropriate force suitable to cause one haptic-jamming member either to approach or to distance itself from another haptic-jamming member.

In electrostatics, like charges repel, and thus compressing a polymer into a smaller area (i.e., the displacement of the surface area dA<0) may increase the stored electrical energy. Similarly, decreasing the thickness z, (i.e., the displacement of the thickness dz<0) may also increase the stored electrical energy. If dA>0, this implies that dz<0, where the resulting thickness z'=z+dz, and thus z'<z.

In a subset of polymer materials (e.g., elastomers), constant volume may be assumed. This is because the bulk compressibility is usually greater than its elastic modulus, and thus A*z=constant or substantially constant. This is a good assumption for elastomers and a reasonable assumption for some polymers that are not elastomers. Some polymers may be compressible, such that the volume in a relaxed state will be different than the volume in a compressed state.

It should be noted that capacitance (C) of a polymer may be the product of the permittivity of the vacuum ($\varepsilon_0$) times the relative permittivity of the polymer ($\varepsilon$) over the surface area A of the polymer per unit thickness z. Alternatively, the thickness z may be expressed as the product of the permittivity of the vacuum $\varepsilon_0$, times the polymer's relative permittivity c, over the surface area A of the polymer normalized to the capacitance C of the polymer. Thus, the change in thickness may be related to a specified constant multiplied by the change in area.

The pressure (p) created by an electrostatic (or electric) field is the compressive stress exerted on a surface area A through a thickness displacement dz necessary to provide mechanical work on the polymer. The pressure, or Maxwell stress, is related to the square of the strength of the electrostatic field. It may be shown that the electrical potential (electrical energy stored=½$CV^2$, where C=capacitance, V=Voltage=zE, and E=electrostatic field strength) is related to a product of the two aforementioned permittivities ($\varepsilon_0$ and $\varepsilon$), the volume (Az), and the square of the electrostatic field strength $E^2$. This yields a value of the Maxwell stress, $p=\varepsilon_0\varepsilon E^2=\varepsilon_0\varepsilon(V/z)^2$. It can be seen, from the dependency of the pressure on the electrostatic field, that if the contacts or electrodes that generate the electrostatic field approach one another, the pressure quadratically rises. Additionally, a polymer disposed between the two contacts or electrodes will also help contribute to the strength of the pressure from the strength of its relative permittivity c as well.

Examples of polymers suitable for use in various embodiments described herein may include elastomers, silicones, acrylics, and/or polyurethanes. An element may be of a single polymer or at least two distinct layers of polymers. A first layer, for example, may be a soft matrix with low permittivity. A second layer may be a stiff high permittivity polymer. Such an arrangement may provide an additional level of mitigation over the polarization, electrostatic, and/or electromechanical behavior of a haptic-jamming device as the electrostatic field is modified. Such behavior may be non-linear in response with linear changes in the strength of the polarization-inducing electrostatic field.

The level of frictional forces between the two elements of a haptic-jamming device may depend on the amount of separation between the elements. The amount of separation may depend on the strength of the electrostatic field and on the composition of the first and second haptic-jamming elements, including their respective polarizabilities and permittivities. Permittivity, as used herein, indicates the polarizable nature of a material. Polarizability, as used herein, refers to the ratio of the average dipole moment to the applied electric (or electrostatic) field.

FIG. 1A illustrates top views of configurations of at least two exemplary haptic-jamming members 101 and 103 that, when combined with a complementary member, may be utilized in one or more of the haptic-jamming embodiments described herein. In one view, two haptic-jamming members 101 and 103 are illustrated, each of which includes at least two components: an element 102, a layer of which may be electrostatically and/or electro-mechanically polarizable, and an elongated extension 104 (see haptic-jamming member 101) or an elongated extension 106 (see haptic-jamming member 103) that is coupled to element 102 and may be outwardly disposed from element 102 as illustrated.

In FIG. 1A, the element 102 is depicted as circular, and may be cylindrical in a 3-dimensional presentation such that it may possess depth, which is not shown in the top projected view. Also, while element 102 is depicted as circular, it may possess any other suitable shape including, but not limited to, a cylindrical shape, a hollow cylindrical shape, a partial-spherical shell shape, and/or any other suitable geometric and/or non-geometric shape. Element 102 may possess an axis 110 about which it is configured to rotate within the plane as depicted in FIG. 1A. The combination of element 102 with an extension 104 or 106 may be included in a first haptic-jamming member 101 or 103, respectively. The extension 104/106 may be attached to element 102 in such a way that if element 102 rotates about axis 110 within the plane of the view, then the extension 104/106 may co-rotate with element 102.

In depiction 101, the extension 104 may be so disposed to approximate a tangential connection with element 102. In depiction 103, the extension 106 may be so disposed to approximate a radial connection to element 102. Additionally or alternatively, such elongated extensions may outwardly extend in any suitable direction from any suitable point on the element 102. The extension 104/106 may be made of any suitable material, such as a rigid or semi-rigid material, that may be reactive or non-reactive to electrostatic forces and/or to electro-mechanical forces. The material of extension 104/106 may be one of appropriate stiffness, such that external forces do not cause the extension 104/106 to bend or to deform appreciably from its default or relaxed state. In some examples, element 102 and/or extension 104/106 may include one or more layers of polarizable, electrostatic, conductive, and/or electro-mechanical materials.

In FIG. 1A, depictions 105 and 107 illustrate a pair of first and second haptic-jamming members 101A and 101B and a pair of first and second haptic-jamming members 103A and 103B respectively combined to form exemplary haptic-jamming devices 112 and 114. In these depictions, haptic-jamming devices 112 and 114 each respectively include a first haptic-jamming member 101A/103A combined with a corresponding second haptic-jamming member 101B/103B, which may, for example, be the complement of the corresponding first haptic-jamming member 101A/103A as shown. This complementary second haptic-jamming member 101B/103B may be, in some examples, a mirror image of the first haptic-jamming member 101A/101B. Additionally or alternatively, a haptic-jamming device may include any other suitable combination of haptic-jamming members, without limitation. In the exemplary depiction 105, the first (upper) haptic-jamming member 101A has an element 102A and an extension 104A, and the second (lower) haptic-jamming member 101B has an element 102B and an extension 104B. As shown in this figure for illustrative purposes, the second (lower) haptic-jamming member 101B has been rotationally offset from the first (upper) haptic-jamming member 101A about an axis (e.g., axis 110) oriented generally perpendicular to the plane of the page.

In the exemplary depiction 107 in FIG. 1A, the first (upper) haptic-jamming member 103A has an element 102A and an extension 106A, while the second (lower) haptic-jamming member 103B has an element 102B and an extension 106B. A rotational offset between element 102A/extension 106A with that of element 102B/extension 106B about an axis (e.g., axis 110) is illustrated in depiction 107. In this example, the elements 102A and/or 102B may be circular, as illustrated, or any other appropriate shape to facilitate the embodiment.

In some examples, first and second haptic-jamming members 101A and 101B may rotate about a common axis, such as axis 110 shown in FIG. 1A. Likewise, first and second haptic-jamming members 103A and 103B may rotate about a common axis. The haptic-jamming devices 112 and 114 shown in depictions 105 and 107 of FIG. 1A permit that a first haptic-jamming member 101A/103A may be rotated relative to the corresponding second haptic-jamming member 101B/103B with frictional mitigation. This is the controlling force utilized to change the rate of and/or resistance to rotation between extensions 104A and 104B in depiction 105 or between extensions 106A and 106B in depiction 107 through the establishment of frictional forces between the positionally adjacent elements 102A and 102B.

In various embodiments, haptic-jamming members of haptic-jamming devices 112 and 114 may be movably supported and held in a desired configuration and orientation with respect to each other. For example, haptic-jamming members 101A and 101B (and likewise haptic-jamming members 103A and 103B) may maintained in a desired position with respect to each other by, for example, a support member, such as a rod, pin, or other pivot member located at an axis (e.g., axis 110) extending between haptic-jamming members 101A and 101B. Such a support member (e.g., a rod) may allow for elements 102A and 102B of haptic-jamming members 101A and 101B to rotate with respect to each other while holding them in a substantially overlapping arrangement in relatively close proximity to each other. Additionally, one or more of elements 102A and 102B of haptic-jamming members 101A and 101B may define a central opening at the axis (e.g., axis 110) that surrounds the support member, allowing haptic-jamming member 101A and/or haptic-jamming member 101B to move along the support member toward and away from the other of haptic-jamming member 101A and 101B in response to changes in an electric field surrounding element 102A or 102B. Additionally or alternatively, haptic-jamming members of haptic-jamming devices 112 and 114 may be supported by any other suitable support mechanism, without limitation. For example, a peripheral support member having an inner cylindrical or partial-cylindrical surface may closely surround a circular and/or cylindrical periphery of haptic-jamming members 101A and 101B (and likewise haptic-jamming members 103A and 103B). In at least one example, such a peripheral support member may peripherally surround a cylindrical outer surface of elements 102A and 102B of haptic-jamming members 101A and 101B such that elements 102A and 102B may rotate with respect to each other within the peripheral support member.

Figure 1B:
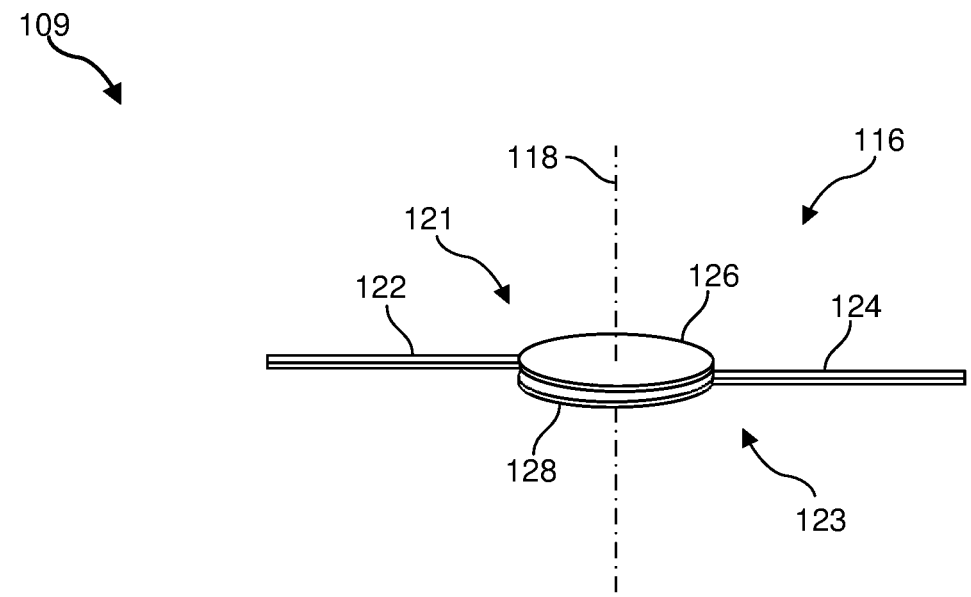
FIG. 1B depicts possible states of an exemplary single haptic-jamming device, in accordance with some of the embodiments described in the present application.
Figure 1B:
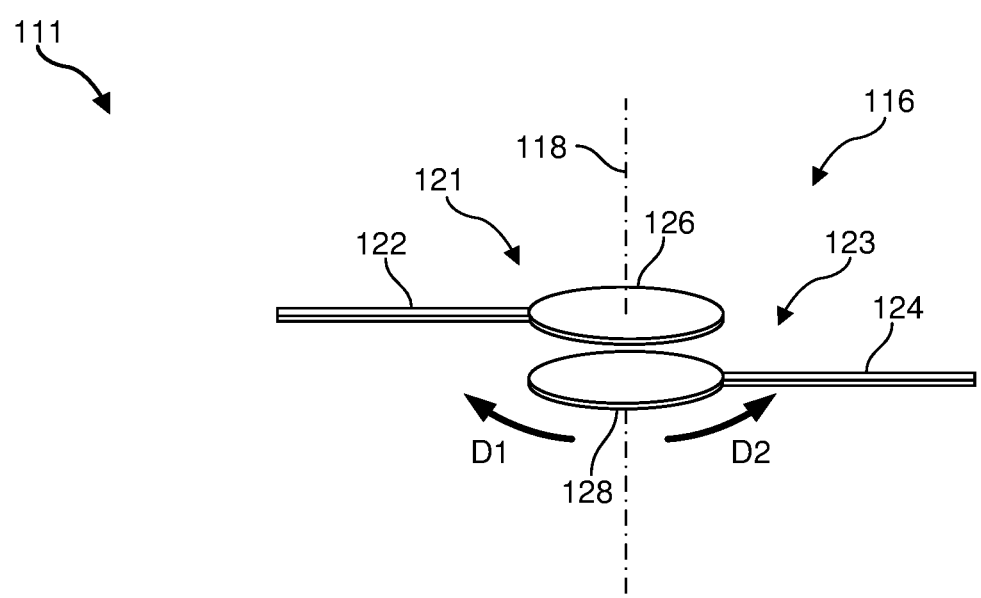

FIG. 1B illustrates a haptic-jamming device 116 that includes a combination of complementary first and second haptic-jamming members 121 and 123. As shown in this figure, first haptic-jamming member 121 may include an extension 122 coupled to an element 126 and second haptic-jamming member 123 may include an extension 124 coupled to an element 128. In at least one example, first haptic-jamming member 121 and/or second haptic-jamming member 123 may be oriented and configured to rotate about an axis. For example, as shown in FIG. 1B, first haptic-jamming member 121 and second haptic-jamming member 123 may each be configured to rotate in rotational directions D1 and D2 with respect to each other about a common axis 118 extending through elements 126 and 128.

The two depictions 109 and 111 show haptic-jamming device 116 in two different states associated with differences in electrostatic forces developed between respective elements 126 and 128 of the first and second haptic-jamming members 121 and 123. For example, depiction 109 illustrates a first state in which elements 126 and 128 are forced toward each other such that facing surfaces of elements 126 and 128 are in frictional contact with each other and/or in frictional contact with another layer disposed therebetween (see, e.g., FIG. 2). In this first state, movement of haptic-jamming members 121 and 123 with respect to each other may be restricted by frictional or other forces between elements 126 and 128. Additionally, depiction 111 illustrates a second state in which elements 126 and 128 are at least partially separated and/or in which elements 126 and 128 are held in contact with each other with a lower degree of force than that illustrated in depiction 109 such that rotational movement between elements 126 and 128 is not restricted. While depiction 111 shows a noticeable degree of separation between elements 126 and 128 for purposes of illustration only, a substantially lower amount of separation and/or no separation may, in actuality, exist between elements 126 and 128 in such a second state as described herein.

In some embodiments, a volume may be disposed, at least temporarily, between the inner surfaces of the elements 126 and 128 of haptic-jamming device 116. Such a volume may include any suitable medium, such as an electrically insulative and/or dielectric medium. Dielectric materials may be classified as being active or passive. Active dielectrics easily adapt to store electrical energy, while passive dielectrics restrict the flow of electrical energy therein, thus acting essentially as insulators. Examples of the latter, for example, would be glass, mica, and rubber. In some examples, a solid or semi-solid material, such as, for example, a polymer, ceramic, glass, mica, and/or composite material, may be disposed between elements 126 and 128. In such an example, upon generating an electrostatic field between elements 126 and 128, at least one of elements 126 or 128 may be attracted to the opposing conductive element 126 or 128 and may encounter the solid material volume disposed therebetween such that the solid material provides an appropriate frictional force. Additionally or alternatively, a fluid, such as a gas (e.g., air) or a liquid (e.g., a mineral oil or a silicone fluid), may be disposed between elements 126 and 128.

In some embodiments, element 126 of first haptic-jamming member 121 and/or element 128 of second haptic-jamming member 123 may be multilayered. For example, an outer surface of element 126/128, such as a surface of element 126 facing away from element 128, may include a material possessing electrically conductive properties. Additionally, one or more inner layers of element 126/128 may include an insulative and/or dielectric material, such as a ceramic, glass, plastic, mica, and/or any other suitable material having suitable insulative and/or dielectric properties. In at least one example, such inner layers of elements 126 and 128 of the first and second haptic-jamming members 121 and 123, respectively, may be disposed between outer conductive surfaces of elements 126 and 128, with the inner layers oriented so as to face each other. In some examples, these facing layers of elements 126 and 128 may be in contact with each other when conductive surfaces of elements 126 and 128 are supplied with a suitable voltage to produce an electrostatic field, as shown in depiction 109. A disparity in potential applied between such conductive surfaces of elements 126 and 128 may control an amount of separation between respective elements 126 and 128 of haptic-jamming members 121 and 123, allowing for a selected amount of frictional contact and/or separation therebetween. Depiction 111 illustrates a state in which a potential applied between conductive surface of elements 126 and 128 is lower such that a there is a lower degree of frictional engagement between elements 126 and 128 and/or a higher degree of separation between elements 126 and 128. A greater frictional force between elements 126 and 128 of haptic-jamming members 121 and 123 may thus mitigate the relative rotations/movements of elements 126 and 128 and their associated extensions 122 and 124. In at least one example, the inner surface of element 126 and/or 128 facing the other of element 126 and/or 128 may possess a surface roughness that facilitates the generation of greater frictional forces when the inner surface of elements 126 and 128 are in contact with each other.

In some embodiments, a dielectric material may be disposed between two elements, such as elements 126 and 128 shown in FIG. 1B. The dielectric material may be physically attached to one of elements 126 and 128. Alternatively, the dielectric material may not have any physical attachment to element 126 or element 128 when haptic-jamming device 116 is in a relaxed state (e.g., when little or substantially no electric field is produced between elements 126 and 128). Upon energizing an electric field between elements 126 and 128 via a voltage applied to elements 126 and 128, a distance between elements 126 and 128 may decrease so as to increase an amount of frictional contact between various abutting element interfaces of elements 126 and 128 and a dielectric material disposed therebetween. A level of attachment, a level of induced frictional force, a level of stiffness, and/or a level of joint movement between elements 126/128, and/or an abutting dielectric material may depend linearly or non-linearly on the strength of the electrostatic field generated. In some embodiments, this electrostatic field strength may be varied by, for example, pulse-width modulation. This type of example is described in greater detail below in connection with FIG. 2. The aforedescribed examples may assume that the permittivity of the mediating dielectric material is positive. In some embodiments, a dielectric material may include a metamaterial, which may possess negative permittivities that are opposite to those of conventional dielectrics. Such metamaterials may provide an attraction between similar charges, or conversely a repulsion between dissimilar charges. In some examples, at least one of the elements 126 or 128 of haptic-jamming device 116 may include various layers of varying dielectric constants, frictional layers to increase the forces of the frictional engagements, conductive materials, and/or piezoelectric materials.

Figure 2:
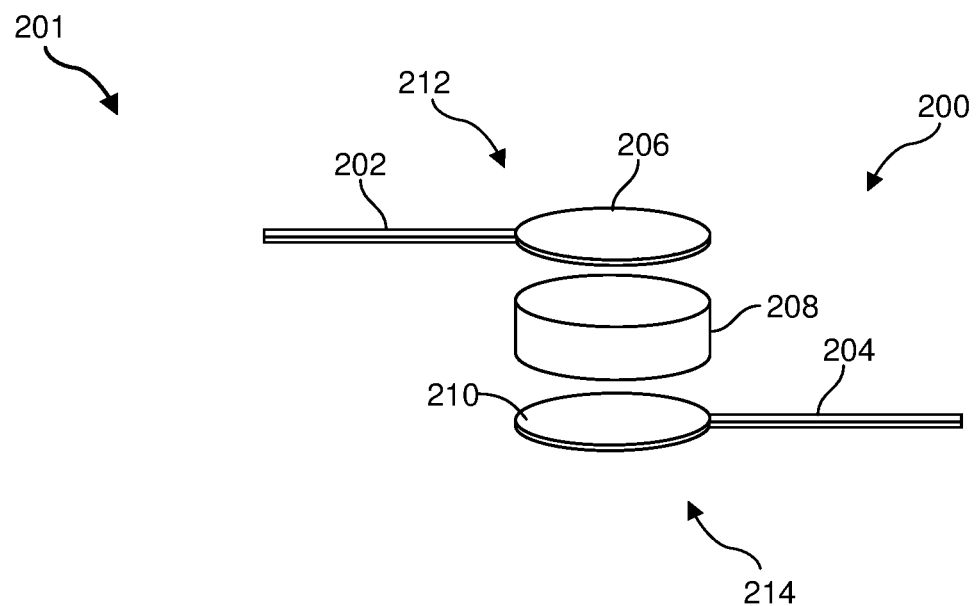
FIG. 2 depicts, in perspective views, two possible modes of an exemplary single haptic-jamming device, in accordance with some of the embodiments described in the present application.
Figure 2:
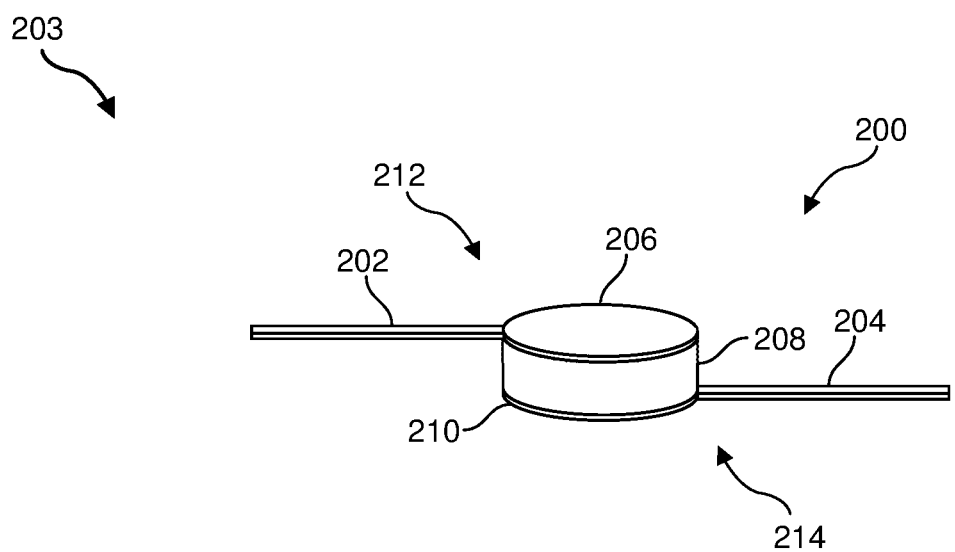

FIG. 2 illustrates an example of a haptic-jamming device 200 that includes a first haptic-jamming member 212 and a second haptic-jamming member 214, with an intermediate layer 208 interposed between two elements 206 and 210 of the first and second haptic-jamming members 212 and 214, in accordance with some embodiments. Elements 206 and 210 may each have a layer that is electrically conductive. Each of the first haptic-jamming member 212 and the second haptic-jamming member 214 may include an elongated extension, such as extension 202 coupled to element 206 and extension 204 coupled to element 210. Application of disparate voltages between conductive layers of elements 206 and 210 may generate an electrostatic field, which may cause the two elements 206 and 210 to alter their relative locations with respect to each other.

In the absence of an electrostatic field, the haptic-jamming device 200 of FIG. 2 may mimic that shown in the depiction 201, with first haptic-jamming member 212 and/or second haptic-jamming member 214 being freely moveable with respect to intermediate layer 208 and/or at least partially separated from intermediate layer 208. If, however, an electrostatic field is generated by the application of a potential difference between the elements 206 and 210, as in the depiction 203, the elements 206 and 210 may more closely approach each other and intermediate layer 208. Accordingly, the elements 206 and 210 may frictionally engage their respective inner surfaces with the intermediate layer 208 as shown. The intermediate layer 208 interposed between the elements 206 and 210 may or may not possess a level of compressibility. In some embodiments, special coatings and/or polymers may be attached to element 206 and/or 208 to increase frictional contact with intermediate layer 208 and/or to enhance electrical properties of element 206 and/or 208.

In an additional embodiment, a first haptic-jamming member and a second haptic-jamming member may have conductive co-axial hollow cylindrical geometric forms. In this example, a first cylinder may be a component of a first haptic-jamming member and may surrounds at least a portion of a second haptic-jamming member, which may also be in the form of a cylinder. One or more polymers may be disposed between these elements, and these polymers may undergo dimensional changes whenever an electrostatic field is present. Thus, by controlling the level of the electrostatic field generated between the first cylinder and the second cylinder, a frictional force may be generated from the physical alteration of the thickness of the polymer(s) disposed therebetween.

In alternative embodiments, at least one of the haptic-jamming members of a haptic-jamming device may include one or more elements (e.g., elements 126 and 128 in FIG. 1B and/or elements 206 and 210 in FIG. 2) formed of a piezoelectric material. A piezoelectric effect may be generated using, for example, a material that may include an underlying crystalline structure (e.g., a piezoceramic or piezopolymer material), such that a mechanical compression of the piezoelectric material in a given direction creates a potential difference, or equivalently, a change in polarization of the material. The dipoles present (e.g., polar molecules) in the material may re-orient themselves under the externally generated mechanical forces. The antithesis is also possible, and may be applied to the embodiments described herein, in which disparate potentials applied to the contacts of the piezoelectric material induce mechanical contraction and/or expansion resulting in the production of vibrations.

In some embodiments, due to the electro-mechanical properties of piezoelectric materials, high frequency or ultrasonic vibrations may be induced in the elements and/or polymers that may be attached thereto. Such vibratory behavior may reduce the level of frictional engagement or stiction and permit one haptic-jamming member to rotate relative to at least another haptic-jamming member of a haptic-jamming device, as described and shown herein. For example, vibrations may be induced via this piezoelectric effect in one or both elements (e.g., elements 126 and/or 128 in FIG. 1B) of haptic-jamming members (e.g., haptic-jamming members 121 and 123) of a haptic-jamming device (e.g., haptic-jamming device 116) as shown and described herein. The elements of the respective haptic-jamming members may, for example, be fully frictionally engaged while one or both of the elements containing the piezoelectric material is not energized. Subsequently, when the piezoelectric material of one or both of the elements vibrates, the vibrations may cause the atomic bonds between surfaces that are responsible for the frictional forces to break, reducing the static friction and thus allowing greater relative movement (e.g., rotational movement) of the haptic-jamming members with respect to each other (see, e.g., FIGS. 1A-1B).

The presence of piezoelectric material in a haptic-jamming member may allow an additional or separate electro-mechanical control over the separation between the haptic-jamming members, thus controlling the amount of frictional force that may exist between them. Examples of suitable piezoelectric materials may include piezoceramics, such as PZT (lead zirconate titanate). In some examples, a subset of ferroelectric materials may also suffice for use as piezoelectric materials. In other examples, a piezoelectric material may include a polymer, including, but not limited to, bulk polymers, composite polymers (integrated with ceramics), and voided charged polymers. Examples of such bulk polymers include polyvinylidene fluoride (PVDF) and its various co-polymers, Parylene-C, and polyimide. An example of a composite polymer includes $BaTiO_3$ nanoparticles mixed with polydimethylsiloxane. Examples of voided charged-polymers include cellular polypropylene, cellular polyethylene-naphthalate, and cellular polydimethylsiloxane.

Figure 3:
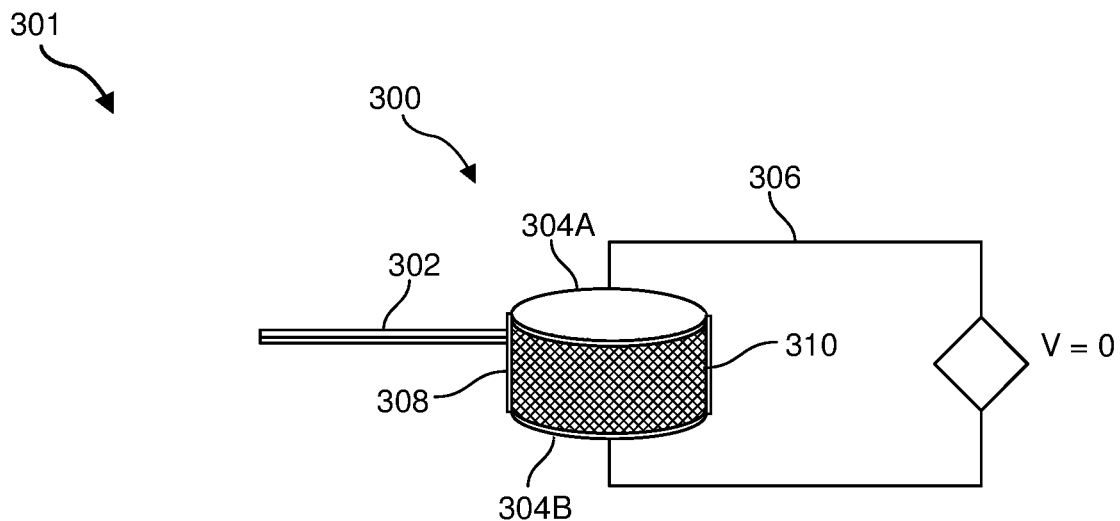
FIG. 3 depicts, in perspective views, two possible modes of an exemplary single haptic-jamming device, in accordance with some of the embodiments described in the present application.
Figure 3:
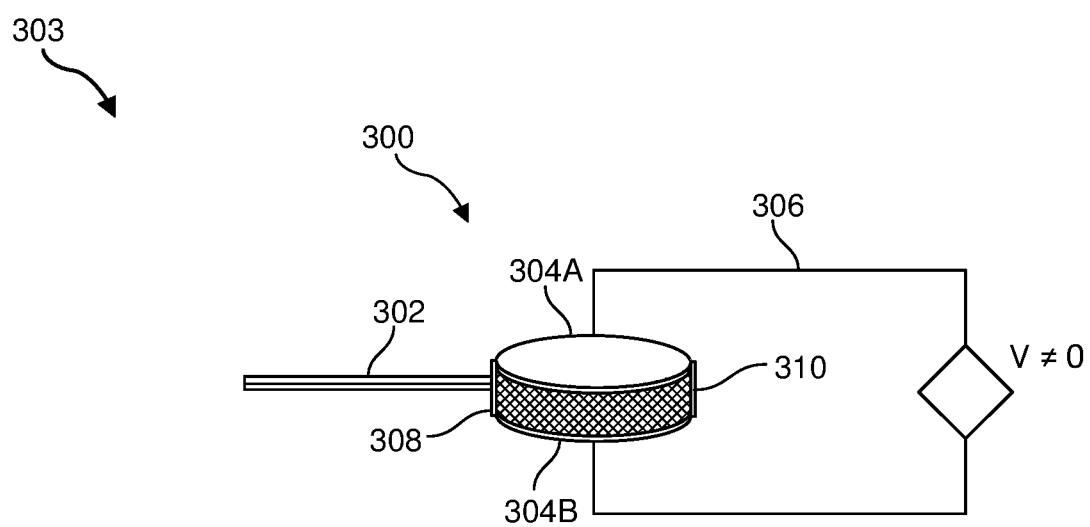

An illustration of the piezoelectric effect is presented in FIG. 3. In this figure, a haptic-jamming member 300, as respectively shown in a relaxed state and a compressed state in depictions 301 and 303, may include an element 308 having a piezoelectric material 310 disposed between abutting contacts 304A and 304B connected electrically to a variable voltage source 306. As shown in depiction 301, when voltage source 306 applies a voltage of V=0 (i.e., no potential is generated by external voltage source 306) to contacts 304A and 304B, then the piezoelectric material 310 of element 308 may be relaxed between contacts 304A and 304B.

In an example of a haptic-jamming device as described herein, a frictional force may be generated by the use of piezoelectric material, such as piezoelectric material 310 of element 308. In this example, a first haptic-jamming member (e.g., haptic-jamming member 300 of FIG. 3) may require an opposed surface, such as an element surface of a second haptic-jamming member, for frictional engagement when the piezoelectric material of the first haptic-jamming member is in the relaxed state. A second haptic-jamming member (see, e.g., FIG. 4) may thus be required to contribute in forming the resistive frictional forces.

When the contacts 304A and 304B of the piezoelectric material 310 of the first haptic-jamming member 300 are energized at distinct potentials, the piezoelectric material 310 disposed between the contacts 304A and 304B may shrink in thickness, as illustrated in depiction 303, such that element 308 may distance itself from an engagement surface of a second haptic-jamming member. In some embodiments, this second haptic-jamming member may possess no electrostatic or electro-mechanical properties of its own and may only be used to provide a surface by which the first haptic-jamming member, or an intermediate layer (see, e.g., intermediate layer 208 in FIG. 2) disposed therebetween, may engage to generate the requisite frictional forces to provide sufficient resistance to prevent, or slow, haptic movements. In some embodiments, a polymer material may be disposed between the first haptic-jamming member and the second haptic-jamming member. In some embodiments, as illustrated in FIG. 3, a non-zero voltage may be applied by voltage source 306 to the contacts 304A and 304B of haptic-jamming member 300, resulting in a contraction of the piezoelectric material 310 as illustrated in depiction 303.

Figure 4:
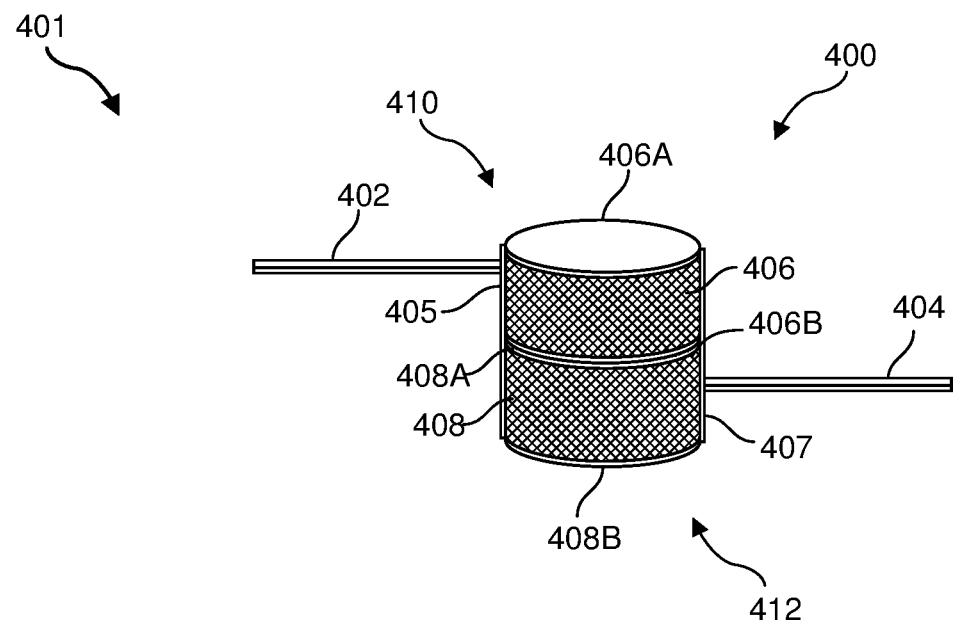
FIG. 4 depicts, in perspective views, two possible modes of an exemplary single haptic-jamming device, in accordance with some of the embodiments described in the present application.
Figure 4:
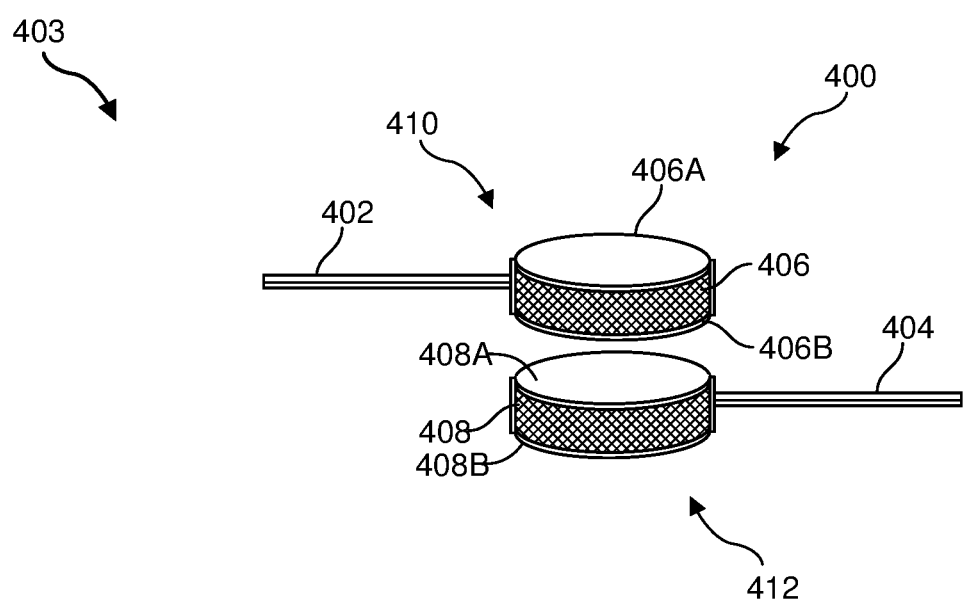
Figure 5:
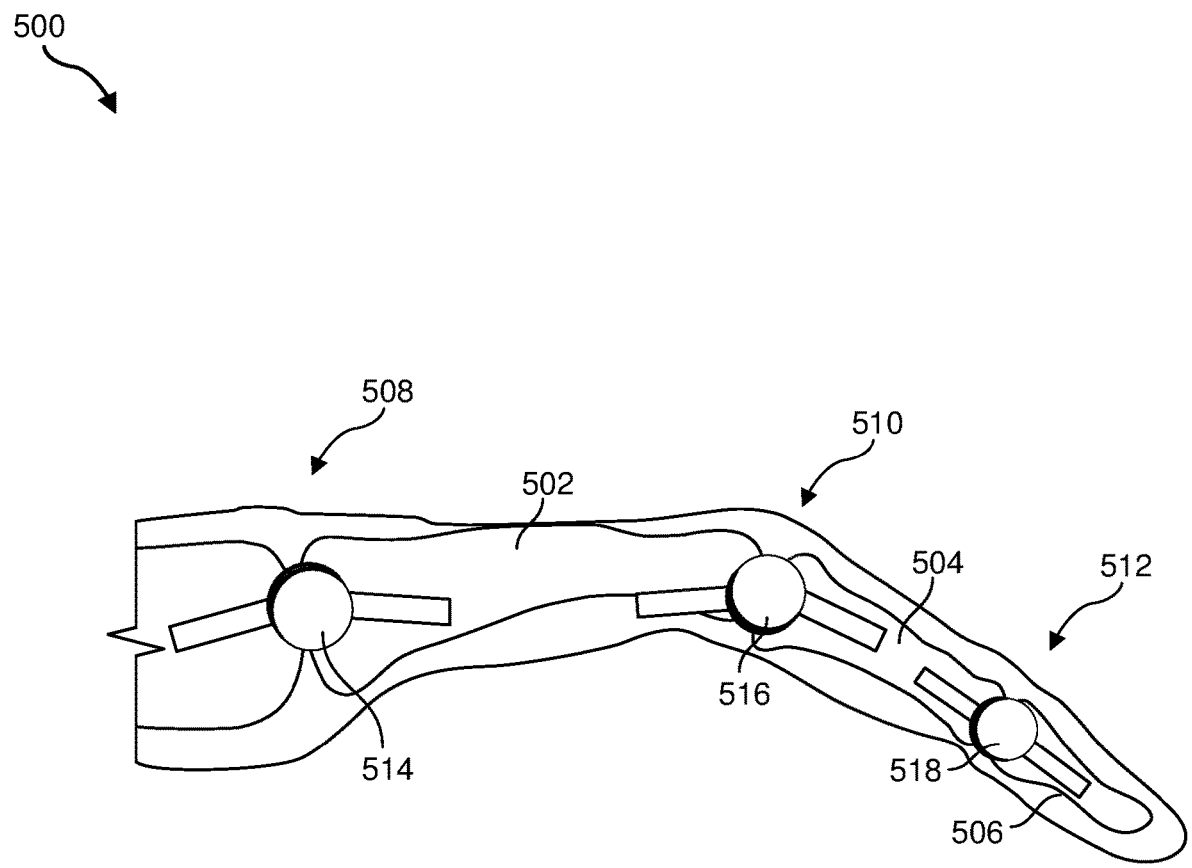
FIG. 5 depicts, in a side view, the various joints and phalanges of a finger and the placement of exemplary haptic-jamming devices, in accordance with some of the embodiments described in the present application.

The application of the piezoelectric effect to induce or to relieve mechanical friction, and thus permit a haptic-jamming device to control stiffness or rate of change of rotational motion, is presented in FIG. 4. In this figure, a haptic-jamming device 400, as respectively shown in a relaxed state and a compressed state in depictions 401 and 403, may include first and second haptic-jamming members 410 and 412. The first haptic-jamming member 410 of the haptic-jamming device 400 may include an element 405 having a piezoelectric material 406 disposed between two contacts 406A and 406B and an extension 402. The second haptic-jamming member 412 of the haptic-jamming device 400 may include an element 407 having a piezoelectric material 408 disposed between two contacts 408A and 408B and an extension 404.

In the depiction 401, there is no voltage (see, e.g., FIG. 3) applied between the various pairs of end contacts 406A/B and 408A/B, resulting, for example, in the maximum extension of the piezoelectric material 406 and 408 at end surfaces of contacts 408A and 406B (or one or more layers coating contacts 408A and 406B) to be frictionally engaged. The frictional forces may be substantial enough to prevent movement between the two contacts 406B and 408A. By applying a voltage to one or both of the piezoelectric materials 406 and/or 408, a controllable separation, dependent on the voltage and the polarizability of the piezoelectric material, may occur, as illustrated, for example, in depiction 403 of FIG. 4. Application of voltages (see, e.g., FIG. 3) to both pairs of end contacts 406A/B and 408A/B may result in both haptic-jamming members of the haptic-jamming device 400 contracting, i.e., separating, thus reducing physical contact. In some embodiments, an intervening material may be disposed between contacts 406B and 408A to aid in increasing the frictional forces available. This intervening material may, for example, be an insulator such as a polymeric material.

In an additional embodiment, a haptic-jamming device 400 may include a first element 405 that includes a piezoelectric material 406, while a second element 407 separately includes a polarizable material (instead of piezoelectric material 408 described above) disposed between electrical contacts 408A and 408B. Such a polarizable material may be a polymer or other dielectric material. When the contacts 408A and 408B are energized, the electrostatic forces may decrease the thickness of the polarizable material, thus distancing the second element 407 from the first element 405. An insulator or polymer may be disposed between the contacts 406B and 408A and may provide additional frictional contact to inhibit or prevent movement of the first haptic-jamming member 410 with respect to the second haptic-jamming member 412 as desired. In an additional example, the piezoelectric material 406 of element 405 may be induced to vibrate while the polarizable material of element 407 is induced to contract. The combination of both actions (i.e., vibration of element 405 in conjunction with contraction of element 407) may reduce the frictional engagement between elements 405 and 407 and thus permit relative rotational movements between first haptic-jamming member 410 and second haptic-jamming member 412. The level of frictional engagement (or disengagement) may depend on the extent of contraction of element 407 as well as the intensity and frequency of vibration of element 405.

Elements (e.g., 126 or 128 of FIG. 1B) of haptic-jamming members may be of a planar, cylindrical, spherical, partial-spherical, or any other suitable shape and may be at least rotatable through a range of angles. In some examples, one haptic-jamming member may surround or encase another haptic-jamming member, while maintaining a coaxial relationship. This may occur, for example, when the outer layer of a first haptic-jamming member is a hollow cylinder (or hollow spherical shape) and disposed interior to that hollow cylinder is the second haptic-jamming member which may take the geometric form of a hollow or solid cylindrical form. If the first haptic-jamming member possesses conductive properties as does the second haptic-jamming member, and a polymer, such as a dielectric, is disposed therebetween, then it may be possible that when the two haptic-jamming members are energized with disparate potentials an electrostatic field is generated. A dielectric disposed between these two conductive surfaces may undergo dimensional alterations when an electrostatic field is present. This dielectric may abut one of the first or second haptic-jamming devices. Increasing the strength of the electrostatic field disposed between the two conductive surfaces may cause the dielectric to undergo dimensional alterations. Such a change may reduce the frictional contact and permit rotational movement between the dielectric and a haptic-jamming member, to which it was previously engaged in a relaxed or low electrostatic field state.

In an additional embodiment, a first cylinder of a first haptic-jamming member and a second cylinder of a second haptic-jamming member may each include a piezoelectric material disposed between two electrically conductive layers (e.g., an inner conductive layer and an outer conductive layer). A potential difference between the paired electrically conductive layers of the first cylinder may affect the electromechanical properties of the piezoelectric material of that first cylinder, causing the thickness of the wall of the first cylinder to contract, with the extent of contraction corresponding to the strength of the electrostatic field generated between its two electrically conductive layers. Additionally or alternatively, a potential difference between the paired electrically conductive layers of the second cylinder may cause the thickness of the wall of the second cylinder to decrease. One or both of the wall thicknesses of the first or second cylinders may contract upon being energized, which may yield an increase in the separation of the two cylinders (the inner wall of the outer cylinder with the outer wall of the inner cylinder). A greater separation between the cylinders may decrease the forces of frictional contact, thus allowing the two cylinders a greater freedom to rotate relative to one another. In additional examples, the engaging surfaces of one or both of the cylinders may be prepared in such a manner as to increase the frictional contact when engaged with another surface.

In some examples, electro-active polymers (EAP) may be used to provide a mechanism to control the level of engagements between haptic-jamming members to facilitate the reduction in frictional forces engaged therebetween. An EAP may undergo dimensional alterations when an electrostatic field is present and the extent of such alterations is related to the strength of the electrostatic field, the mechanical properties (constitutive relations), and on the dielectric properties (which may be more complicated that a single scalar, e.g., a tensor). In a sandwiched configuration, the EAP may be disposed between two electrodes. An electrode may be compliant, meaning that it may conform to an abutting surface of the polymer, either in the relaxed state or in a compressed state.

In various embodiments, one or more of the afore-described embodiments of a haptic-jamming device may be utilized in a haptic glove worn, for example, by an AR/VR operator. The haptic-jamming devices may communicate to a user's hand a level of stiffness that, for example, indicates the presence of an object interacted with by the user in a virtual environment. In some examples, the haptic-jamming devices may provide haptic feedback that corresponds to pressure that a remote gripper or hand is receiving while performing a remote manipulation of an object.

FIG. 5 depicts the various phalanges of a typical finger 500 (i.e., a human digit) of a user's hand. The phalanges of finger 500 shown in this figure include a proximal phalanx 502, a middle phalanx 504, and a distal phalanx 506. In addition, FIG. 5 illustrates various joints of finger 500, including a metacarpal joint 508, a proximal interphalangeal joint 510, and a distal interphalangeal joint 512.

In some embodiments, one or more of the afore-described haptic-jamming devices may be placed in a haptic glove or other wearable article worn by a user such that the haptic-jamming devices are positioned adjacent selected portions of the user's hand, such as corresponding joints and phalanges of the user's finger 500 as shown in FIG. 5. For example, as shown in FIG. 5, haptic-jamming devices 514, 516, and 518 may be positioned adjacent to corresponding joints of finger 500, with haptic-jamming device 514 arranged at metacarpal joint 508, haptic-jamming device 516 arranged at interphalangeal joint 510, and haptic-jamming device 518 arranged at distal interphalangeal joint 512.

In one embodiment, one or more of haptic-jamming devices 514, 516, and 518 may include a pair of haptic-jamming members (e.g., first and second haptic-jamming members 103A and 103B of haptic-jamming device 114 shown in FIG. 1A). Each of the pair of haptic-jamming members may include, for example, an element (e.g., elements 102A and 102B in FIG. 1A) that is rotatable about an axis (e.g., axis 110 in FIG. 1A) and an elongated extension (e.g., extensions 106A and 106B in FIG. 1a) that is outwardly disposed from the element. As illustrated in FIG. 5, the extensions (e.g., extensions 106A and 106B shown in FIG. 1A) of each haptic-jamming device may be oriented along the phalanges that are connected by each corresponding joint. Thus, an extension of a haptic-jamming member may be placed along one phalanx and the extension of the other haptic-jamming member of the haptic-jamming device may be placed along the other phalanx connected to a common joint. The rotational axis of the rotatable elements of each haptic-jamming device may be placed approximately collinear with a center of rotation of the respective joint of each finger digit.

For example, haptic-jamming device 514 may be positioned and oriented such that rotatable elements of the haptic-jamming member (e.g., elements 106A and 1016B of haptic-jamming members 103A and 103B in FIG. 1A) are positioned adjacent to metacarpal joint 508 such that the haptic-jamming members are rotatable with respect to each other about an axis of rotation of metacarpal joint 508. Elongated extensions of the haptic-jamming members (e.g., extensions 106A and 106B in FIG. 1A) of haptic-jamming device 514 may be oriented along sections of finger 500 connected at metacarpal joint 508. For example, as shown in FIG. 5, a first elongated extension of haptic-jamming device 514 may protrude along a portion of proximal phalanx 502 in a first direction and a second elongated extension of haptic-jamming device 514 may protrude in a second direction along a metacarpal portion of the user's hand connected to the metacarpal joint 508. Haptic-jamming devices 516 and 518 may be similarly positioned adjacent to interphalangeal joint 510 and distal interphalangeal joint 512, respectively. Extensions of haptic-jamming devices 516 and 518 may also be similarly disposed to as to extend along respective portions of proximal phalanx 502, middle phalanx 504, and distal phalanx 506.

In some examples, the elongated extensions (e.g., extensions 106A and 106B in FIG. 1A) of haptic-jamming devices 514, 516, and 518 may be coupled to adjacent portions of finger 500 so as to selectively allow for movement of at least a portion of finger 500 and/or to restrict/prevent movement of at least a portion of finger 500. In some examples, movement of at least a portion of finger 500 may be restricted or prevented by increasing contact (e.g., frictional contact) and/or other forces (e.g., electrostatic forces) between opposed elements (e.g., elements 102A and 102B) of haptic-jamming members of one or more of haptic-jamming devices 514, 516, and 518, as described in greater detail above. For example, proximal phalanx 502 may move freely with respect to middle phalanx 504 when haptic-jamming device 516 is in a first state that reduces forces holding haptic-jamming members of haptic-jamming device 516 in a particular position. Subsequently, movement of middle phalanx 504 with respect to proximal phalanx 502 may be inhibited or prevented when haptic-jamming device 516 is in a second state that increases one or more forces between haptic-jamming members of haptic-jamming device 516. Preventing or restricting movement in such a manner may give a user an impression of contacting an object surface or a viscous medium with corresponding portions of their hand.

In addition to placing haptic-jamming devices at the joints of the hand and wrist, such haptic-jamming devices may also be placed at other bodily joints. Other rotational portions of a user's body, such as other portions of the user's hand (e.g., a wrist joint), portions of the user's arm (e.g., elbow, shoulder), portions of the user's leg (e.g., knee, ankle), and/or any other suitable bodily joints, may be fitted with the appropriate haptic-jamming devices to provide appropriate haptic feedback.

FIG. 6 shows a flow diagram of an exemplary method for providing haptic feedback to a user. In some embodiments, at least a portion of one or more of the steps shown in FIG. 6 may be performed by a computer subsystem or special electronic hardware. In one example, each of the steps presented in FIG. 6 may represent a composite of multiple sub-steps. As illustrated in FIG. 6, at step 610, one or more of the systems and/or devices described herein may generate, using a variable voltage source, an electrostatic field encompassing at least one of a polarizable first element of a first haptic-jamming member or a second element of a second haptic-jamming member. For example, an electrostatic field encompassing at least one of first element 126 of first haptic-jamming member 121 or second element 128 of second haptic-jamming member 123 may be generated using a variable voltage source (see, e.g., FIG. 1B; see also, FIGS. 2-4).

In some embodiments, the first haptic-jamming member may include the first element rotatable about an axis and a first elongated extension outwardly disposed in a first direction from the first element. Additionally, the second haptic-jamming member may include the second element rotatable about the axis and a second elongated extension outwardly disposed in a second direction from the second element. For example, the first haptic-jamming member 121 may include the first element 126 rotatable about an axis 110 and a first elongated extension 122 outwardly disposed in a first direction from the first element 126 (see, e.g., FIGS. 1A and 1B; see also FIGS. 2-4). Additionally, the second haptic-jamming member 123 may include the second element 128 rotatable about the axis 110 and a second elongated extension 124 outwardly disposed in a second direction from the second element 128.

At step 620, of FIG. 6, one or more of the systems and/or devices described herein may control a level of haptic-jamming force restricting movement between the first element of the first haptic-jamming member and the second element of the second haptic-jamming member by controlling a strength of the generated electrostatic field encompassing the at least one of the first element or the second element. For example, a level of haptic-jamming force restricting movement between the first element 126 of the first haptic-jamming member 121 and the second element 128 of the second haptic-jamming member 123 may be control by controlling a strength of the generated electrostatic field encompassing the at least one of the first element 126 or the second element 128.

The afore-described embodiments present systems, devices, and methods that provide haptic feedback to a user through the generation of forces (e.g., frictional forces, electrostatic forces, etc.) by the engagement of two separate surfaces of adjacent haptic-jamming members that are rotatable with respect to each other. These surfaces may be of materials that are electrostatically polarizable and/or possess electro-mechanical behavior. These surfaces may also include electrodes to aid in generating electrostatic fields. The strength of the electrostatic field may be used to control the forces, and accordingly, the level of frictional engagement developed between the two surfaces of the haptic-jamming members.

Thus, an exemplary haptic-jamming device, as described herein, may include at least two haptic-jamming members that are positioned using a common axis of rotation. Such a device may use one or more of polarization of media, electrostatic fields, vibratory behavior, and/or electro-mechanical (e.g., piezoelectric) phenomena to mitigate the level of frictional contact that one haptic-jamming member may have with another haptic-jamming member. Placement of these haptic-jamming devices in a wearable article at one or more joints of a user may permit control, in an augmented or virtual reality situation, of the ability of the user to move the joints with appropriate levels of resistance.

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 700 in FIG. 7. Other artificial reality systems may include a NED that also provides visibility into the real world (e.g., augmented-reality system 800 in FIG. 8) or that visually immerses a user in an artificial reality (e.g., virtual-reality system 900 in FIG. 9). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 7:
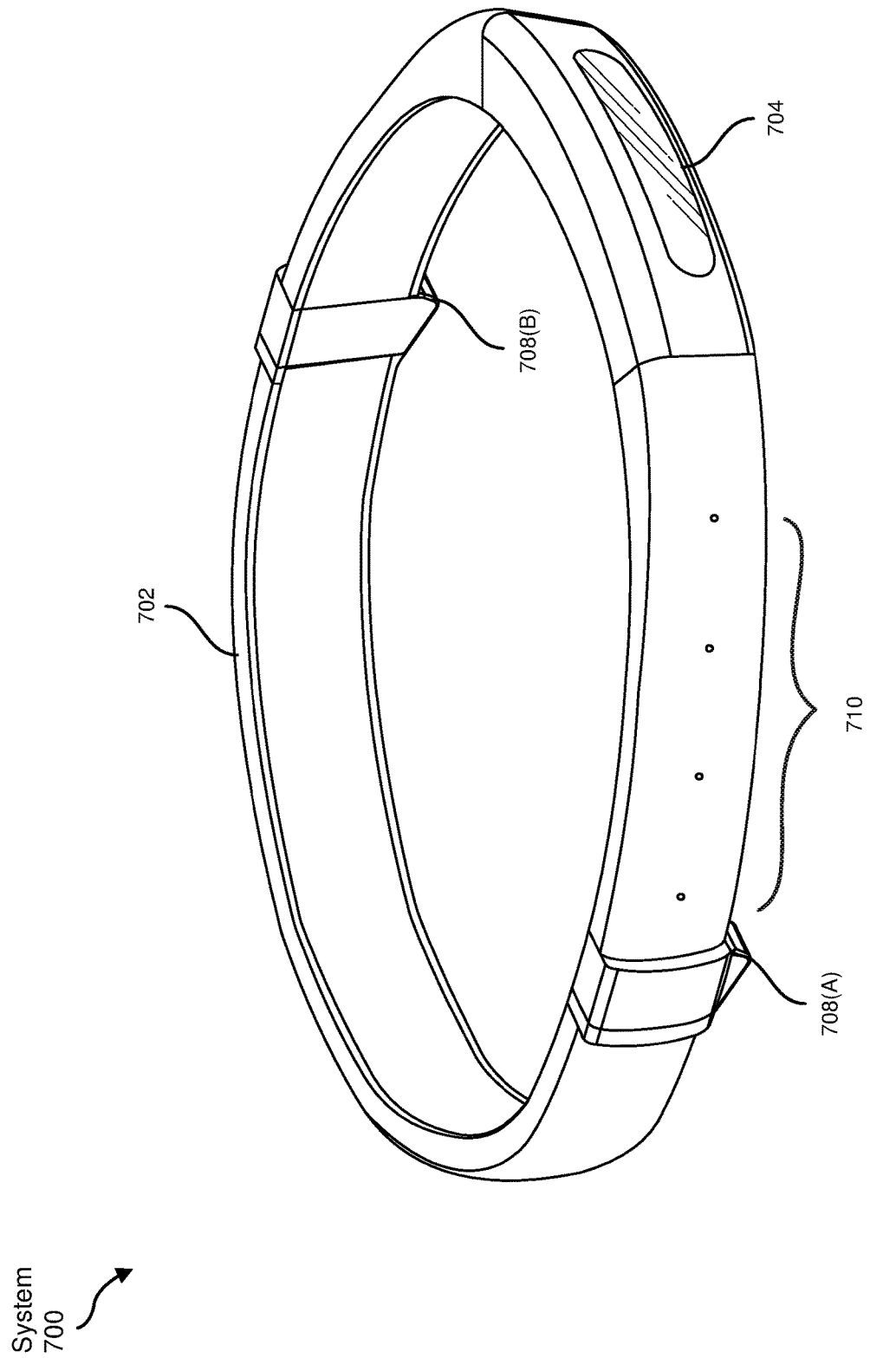
FIG. 7 is an illustration of an exemplary artificial-reality headband that may be used in connection with embodiments of this disclosure.

Turning to FIG. 7, augmented-reality system 700 generally represents a wearable device dimensioned to fit about a body part (e.g., a head) of a user. As shown in FIG. 7, system 700 may include a frame 702 and a camera assembly 704 that is coupled to frame 702 and configured to gather information about a local environment by observing the local environment. Augmented-reality system 700 may also include one or more audio devices, such as output audio transducers 708(A) and 708(B) and input audio transducers 710. Output audio transducers 708(A) and 708(B) may provide audio feedback and/or content to a user, and input audio transducers 710 may capture audio in a user's environment.

As shown, augmented-reality system 700 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 700 may not include a NED, augmented-reality system 700 may include other types of screens or visual feedback devices (e.g., a display screen integrated into a side of frame 702).

Figure 8:
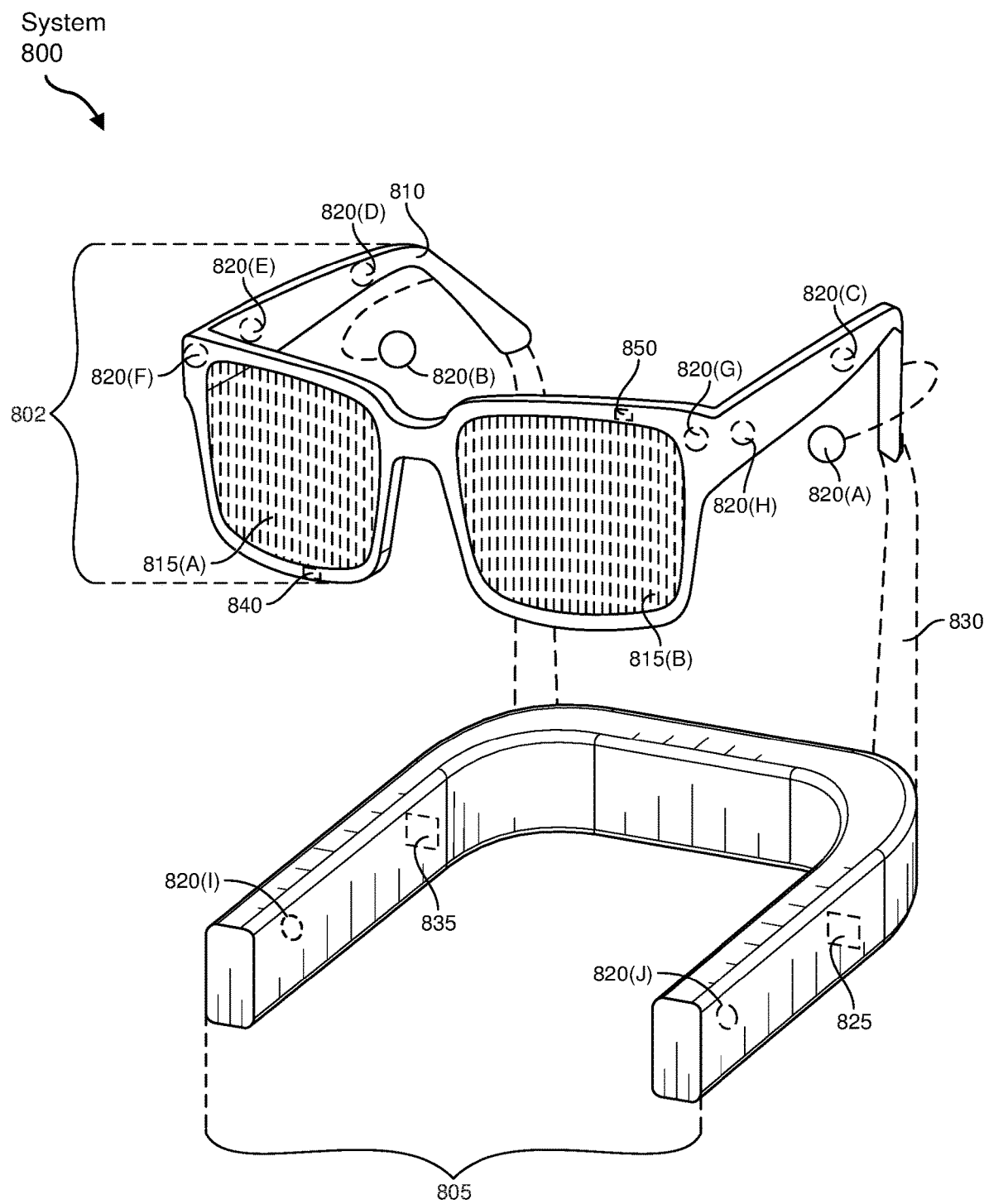
FIG. 8 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 8, augmented-reality system 800 may include an eyewear device 802 with a frame 810 configured to hold a left display device 815(A) and a right display device 815(B) in front of a user's eyes. Display devices 815(A) and 815(B) may act together or independently to present an image or series of images to a user. While augmented-reality system 800 includes two displays, embodiments of this disclosure may be implemented in augmented-reality systems with a single NED or more than two NEDs.

In some embodiments, augmented-reality system 800 may include one or more sensors, such as sensor 840. Sensor 840 may generate measurement signals in response to motion of augmented-reality system 800 and may be located on substantially any portion of frame 810. Sensor 840 may represent a position sensor, an inertial measurement unit (IMU), a depth camera assembly, or any combination thereof. In some embodiments, augmented-reality system 800 may or may not include sensor 840 or may include more than one sensor. In embodiments in which sensor 840 includes an IMU, the IMU may generate calibration data based on measurement signals from sensor 840. Examples of sensor 840 may include, without limitation, accelerometers, gyroscopes, magnetometers, other suitable types of sensors that detect motion, sensors used for error correction of the IMU, or some combination thereof.

Augmented-reality system 800 may also include a microphone array with a plurality of acoustic transducers 820(A)-820(J), referred to collectively as acoustic transducers 820. Acoustic transducers 820 may be transducers that detect air pressure variations induced by sound waves. Each acoustic transducer 820 may be configured to detect sound and convert the detected sound into an electronic format (e.g., an analog or digital format). The microphone array in FIG. 2 may include, for example, ten acoustic transducers: 820(A) and 820(B), which may be designed to be placed inside a corresponding ear of the user, acoustic transducers 820(C), 820(D), 820(E), 820(F), 820(G), and 820(H), which may be positioned at various locations on frame 810, and/or acoustic transducers 820(1) and 820(J), which may be positioned on a corresponding neckband 805.

In some embodiments, one or more of acoustic transducers 820(A)-(F) may be used as output transducers (e.g., speakers). For example, acoustic transducers 820(A) and/or 820(B) may be earbuds or any other suitable type of headphone or speaker.

The configuration of acoustic transducers 820 of the microphone array may vary. While augmented-reality system 800 is shown in FIG. 8 as having ten acoustic transducers 820, the number of acoustic transducers 820 may be greater or less than ten. In some embodiments, using higher numbers of acoustic transducers 820 may increase the amount of audio information collected and/or the sensitivity and accuracy of the audio information. In contrast, using a lower number of acoustic transducers 820 may decrease the computing power required by the controller 850 to process the collected audio information. In addition, the position of each acoustic transducer 820 of the microphone array may vary. For example, the position of an acoustic transducer 820 may include a defined position on the user, a defined coordinate on frame 810, an orientation associated with each acoustic transducer, or some combination thereof.

Acoustic transducers 820(A) and 820(B) may be positioned on different parts of the user's ear, such as behind the pinna or within the auricle or fossa. Or, there may be additional acoustic transducers on or surrounding the ear in addition to acoustic transducers 820 inside the ear canal. Having an acoustic transducer positioned next to an ear canal of a user may enable the microphone array to collect information on how sounds arrive at the ear canal. By positioning at least two of acoustic transducers 820 on either side of a user's head (e.g., as binaural microphones), augmented-reality device 800 may simulate binaural hearing and capture a 3D stereo sound field around about a user's head. In some embodiments, acoustic transducers 820(A) and 820(B) may be connected to augmented-reality system 800 via a wired connection 830, and in other embodiments, acoustic transducers 820(A) and 820(B) may be connected to augmented-reality system 800 via a wireless connection (e.g., a Bluetooth connection). In still other embodiments, acoustic transducers 820(A) and 820(B) may not be used at all in conjunction with augmented-reality system 800.

Acoustic transducers 820 on frame 810 may be positioned along the length of the temples, across the bridge, above or below display devices 815(A) and 815(B), or some combination thereof. Acoustic transducers 820 may be oriented such that the microphone array is able to detect sounds in a wide range of directions surrounding the user wearing the augmented-reality system 800. In some embodiments, an optimization process may be performed during manufacturing of augmented-reality system 800 to determine relative positioning of each acoustic transducer 820 in the microphone array.

In some examples, augmented-reality system 800 may include or be connected to an external device (e.g., a paired device), such as neckband 805. Neckband 805 generally represents any type or form of paired device. Thus, the following discussion of neckband 805 may also apply to various other paired devices, such as charging cases, smart watches, smart phones, wrist bands, other wearable devices, hand-held controllers, tablet computers, laptop computers and other external compute devices, etc.

As shown, neckband 805 may be coupled to eyewear device 802 via one or more connectors. The connectors may be wired or wireless and may include electrical and/or non-electrical (e.g., structural) components. In some cases, eyewear device 802 and neckband 805 may operate independently without any wired or wireless connection between them. While FIG. 8 illustrates the components of eyewear device 802 and neckband 805 in example locations on eyewear device 802 and neckband 805, the components may be located elsewhere and/or distributed differently on eyewear device 802 and/or neckband 805. In some embodiments, the components of eyewear device 802 and neckband 805 may be located on one or more additional peripheral devices paired with eyewear device 802, neckband 805, or some combination thereof. Furthermore, Pairing external devices, such as neckband 805, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 800 may be provided by a paired device or shared between a paired device and an eyewear device, thus reducing the weight, heat profile, and form factor of the eyewear device overall while still retaining desired functionality. For example, neckband 805 may allow components that would otherwise be included on an eyewear device to be included in neckband 805 since users may tolerate a heavier weight load on their shoulders than they would tolerate on their heads. Neckband 805 may also have a larger surface area over which to diffuse and disperse heat to the ambient environment. Thus, neckband 805 may allow for greater battery and computation capacity than might otherwise have been possible on a stand-alone eyewear device. Since weight carried in neckband 805 may be less invasive to a user than weight carried in eyewear device 802, a user may tolerate wearing a lighter eyewear device and carrying or wearing the paired device for greater lengths of time than a user would tolerate wearing a heavy standalone eyewear device, thereby enabling users to more fully incorporate artificial reality environments into their day-to-day activities.

Neckband 805 may be communicatively coupled with eyewear device 802 and/or to other devices. These other devices may provide certain functions (e.g., tracking, localizing, depth mapping, processing, storage, etc.) to augmented-reality system 800. In the embodiment of FIG. 8, neckband 805 may include two acoustic transducers (e.g., 820(1) and 820(J)) that are part of the microphone array (or potentially form their own microphone subarray). Neckband 805 may also include a controller 825 and a power source 835.

Acoustic transducers 820(1) and 820(J) of neckband 805 may be configured to detect sound and convert the detected sound into an electronic format (analog or digital). In the embodiment of FIG. 8, acoustic transducers 820(1) and 820(J) may be positioned on neckband 805, thereby increasing the distance between the neckband acoustic transducers 820(1) and 820(J) and other acoustic transducers 820 positioned on eyewear device 802. In some cases, increasing the distance between acoustic transducers 820 of the microphone array may improve the accuracy of beamforming performed via the microphone array. For example, if a sound is detected by acoustic transducers 820(C) and 820(D) and the distance between acoustic transducers 820(C) and 820(D) is greater than, e.g., the distance between acoustic transducers 820(D) and 820(E), the determined source location of the detected sound may be more accurate than if the sound had been detected by acoustic transducers 820(D) and 820(E).

Controller 825 of neckband 805 may process information generated by the sensors on 805 and/or augmented-reality system 800. For example, controller 825 may process information from the microphone array that describes sounds detected by the microphone array. For each detected sound, controller 825 may perform a direction-of-arrival (DOA) estimation to estimate a direction from which the detected sound arrived at the microphone array. As the microphone array detects sounds, controller 825 may populate an audio data set with the information. In embodiments in which augmented-reality system 800 includes an inertial measurement unit, controller 825 may compute all inertial and spatial calculations from the IMU located on eyewear device 802. A connector may convey information between augmented-reality system 800 and neckband 805 and between augmented-reality system 800 and controller 825. The information may be in the form of optical data, electrical data, wireless data, or any other transmittable data form. Moving the processing of information generated by augmented-reality system 800 to neckband 805 may reduce weight and heat in eyewear device 802, making it more comfortable to the user.

Power source 835 in neckband 805 may provide power to eyewear device 802 and/or to neckband 805. Power source 835 may include, without limitation, lithium ion batteries, lithium-polymer batteries, primary lithium batteries, alkaline batteries, or any other form of power storage. In some cases, power source 835 may be a wired power source. Including power source 835 on neckband 805 instead of on eyewear device 802 may help better distribute the weight and heat generated by power source 835.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 900 in FIG. 9, that mostly or completely covers a user's field of view. Virtual-reality system 900 may include a front rigid body 902 and a band 904 shaped to fit around a user's head. Virtual-reality system 900 may also include output audio transducers 906(A) and 906(B). Furthermore, while not shown in FIG. 9, front rigid body 902 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 900 and/or virtual-reality system 900 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 800 and/or virtual-reality system 900 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 700, augmented-reality system 800, and/or virtual-reality system 900 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 7 and 9, output audio transducers 708(A), 708(B), 906(A), and 906(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 710 may include condenser microphones, dynamic microphones, ribbon microphones, and/or any other type or form of input transducer. In some embodiments, a single transducer may be used for both audio input and audio output.

Figure 9:
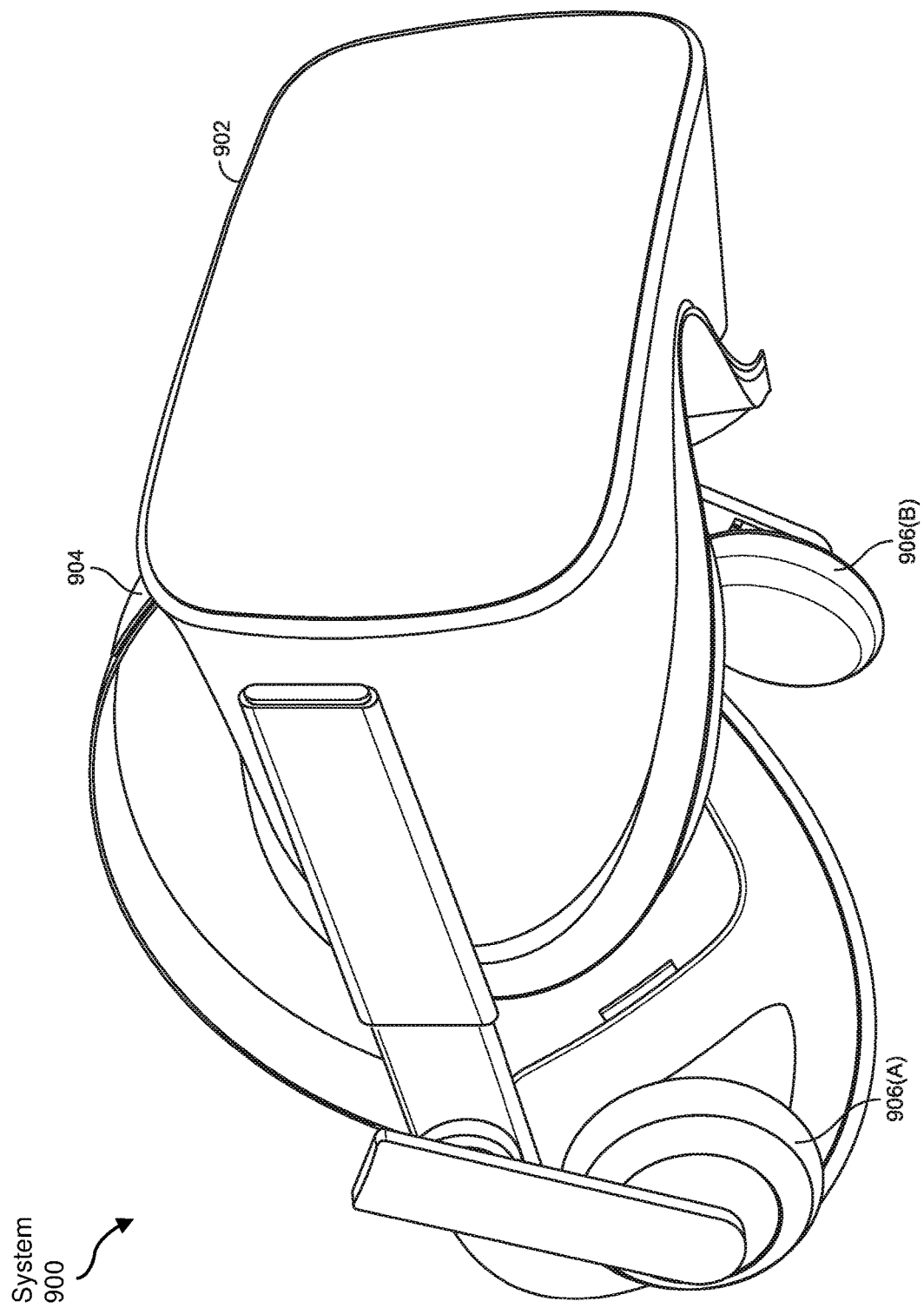
FIG. 9 is an illustration of an exemplary virtual-reality headset that may be used in connection with embodiments of this disclosure.

While not shown in FIGS. 7-9, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As noted, artificial reality systems 100, 200, and 300 may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 10:
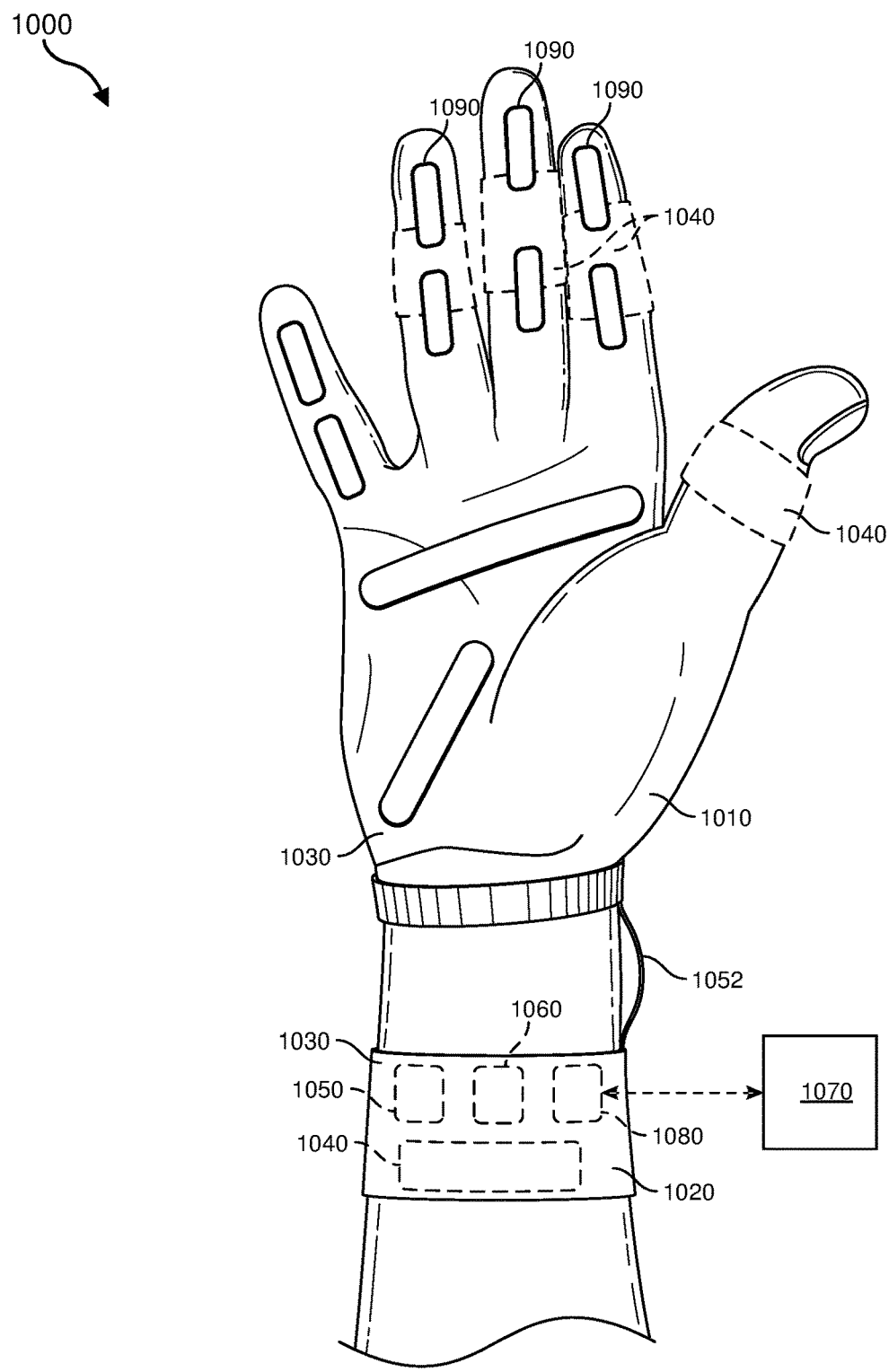
FIG. 10 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 10 illustrates a vibrotactile system 1000 in the form of a wearable glove (haptic device 1010) and wristband (haptic device 1020). Haptic device 1010 and haptic device 1020 are shown as examples of wearable devices that include a flexible, wearable textile material 1030 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1040 may be positioned at least partially within one or more corresponding pockets formed in textile material 1030 of vibrotactile system 1000. Vibrotactile devices 1040 may be positioned in locations to provide a vibrating sensation (e.g., haptic feedback) to a user of vibrotactile system 1000. For example, vibrotactile devices 1040 may be positioned to be against the user's finger(s), thumb, or wrist, as shown in FIG. 10. Vibrotactile devices 1040 may, in some examples, be sufficiently flexible to conform to or bend with the user's corresponding body part(s).

A power source 1050 (e.g., a battery) for applying a voltage to the vibrotactile devices 1040 for activation thereof may be electrically coupled to vibrotactile devices 1040, such as via conductive wiring 1052. In some examples, each of vibrotactile devices 1040 may be independently electrically coupled to power source 1050 for individual activation. In some embodiments, a processor 1060 may be operatively coupled to power source 1050 and configured (e.g., programmed) to control activation of vibrotactile devices 1040.

Vibrotactile system 1000 may be implemented in a variety of ways. In some examples, vibrotactile system 1000 may be a standalone system with integral subsystems and components for operation independent of other devices and systems. As another example, vibrotactile system 1000 may be configured for interaction with another device or system 1070. For example, vibrotactile system 1000 may, in some examples, include a communications interface 1080 for receiving and/or sending signals to the other device or system 1070. The other device or system 1070 may be a mobile device, a gaming console, an artificial reality (e.g., virtual reality, augmented reality, mixed reality) device, a personal computer, a tablet computer, a network device (e.g., a modem, a router, etc.), a handheld controller, etc. Communications interface 1080 may enable communications between vibrotactile system 1000 and the other device or system 1070 via a wireless (e.g., Wi-Fi, Bluetooth, cellular, radio, etc.) link or a wired link. If present, communications interface 1080 may be in communication with processor 1060, such as to provide a signal to processor 1060 to activate or deactivate one or more of the vibrotactile devices 1040.

Vibrotactile system 1000 may optionally include other subsystems and components, such as touch-sensitive pads 1090, pressure sensors, motion sensors, position sensors, lighting elements, and/or user interface elements (e.g., an on/off button, a vibration control element, etc.). During use, vibrotactile devices 1040 may be configured to be activated for a variety of different reasons, such as in response to the user's interaction with user interface elements, a signal from the motion or position sensors, a signal from the touch-sensitive pads 1090, a signal from the pressure sensors, a signal from the other device or system 1070, etc.

Although power source 1050, processor 1060, and communications interface 1080 are illustrated in FIG. 10 as being positioned in haptic device 1020, the present disclosure is not so limited. For example, one or more of power source 1050, processor 1060, or communications interface 1080 may be positioned within haptic device 1010 or within another wearable textile.

Figure 11:
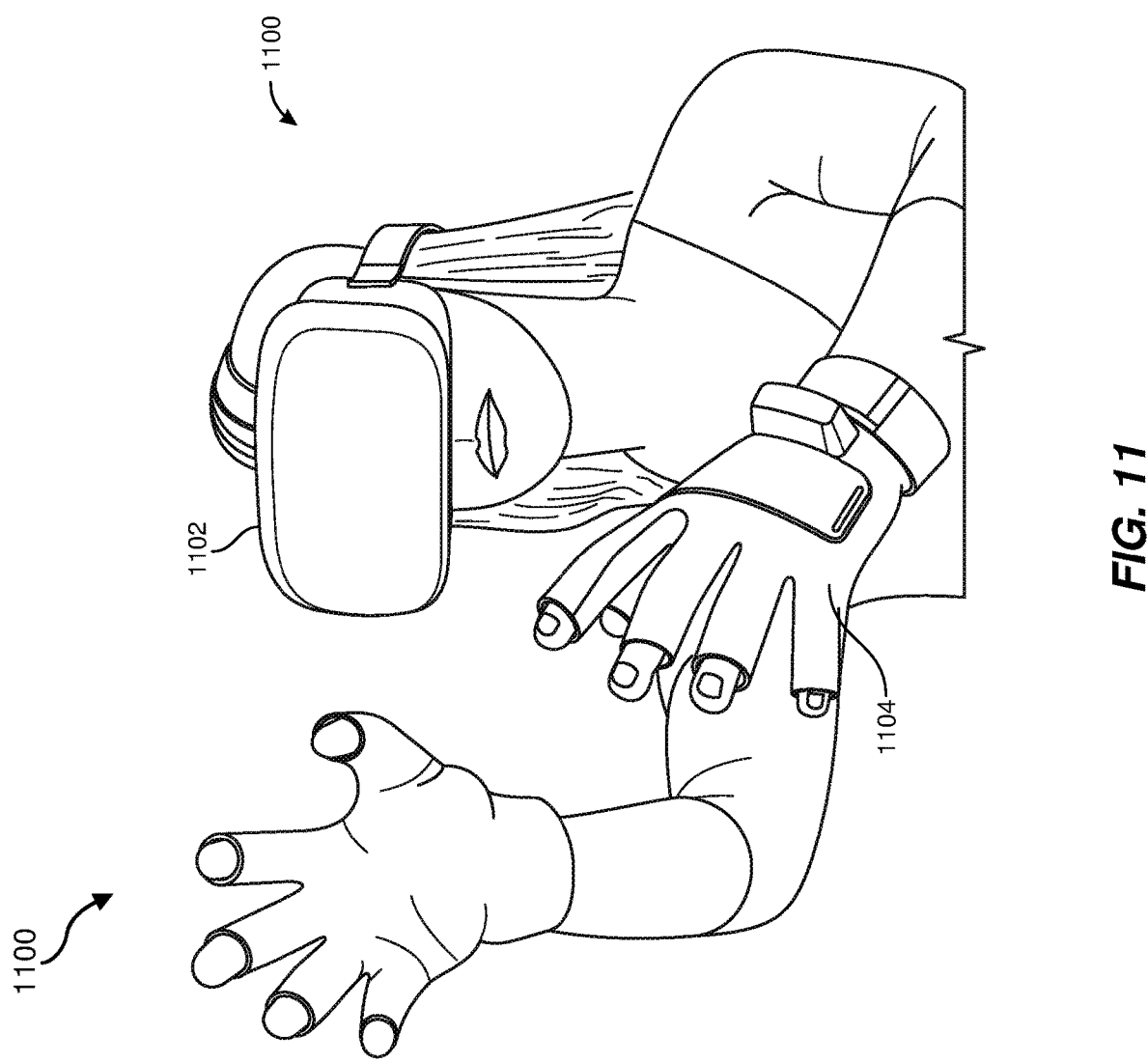
FIG. 11 is an illustration of an exemplary virtual-reality environment according to embodiments of this disclosure.

Haptic wearables, such as those shown in and described in connection with FIG. 4, may be implemented in a variety of types of artificial-reality systems and environments. FIG. 11 shows an example artificial reality environment 1100 including one head-mounted virtual-reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system.

Head-mounted display 1102 generally represents any type or form of virtual-reality system, such as virtual-reality system 900 in FIG. 3. Haptic device 1104 generally represents any type or form of wearable device, worn by a use of an artificial reality system, that provides haptic feedback to the user to give the user the perception that he or she is physically engaging with a virtual object. In some embodiments, haptic device 1104 may provide haptic feedback by applying vibration, motion, and/or force to the user. For example, haptic device 1104 may limit or augment a user's movement. To give a specific example, haptic device 1104 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 1104 to send action requests to a console. Examples of action requests include, without limitation, requests to start an application and/or end the application and/or requests to perform a particular action within the application.

Figure 12:
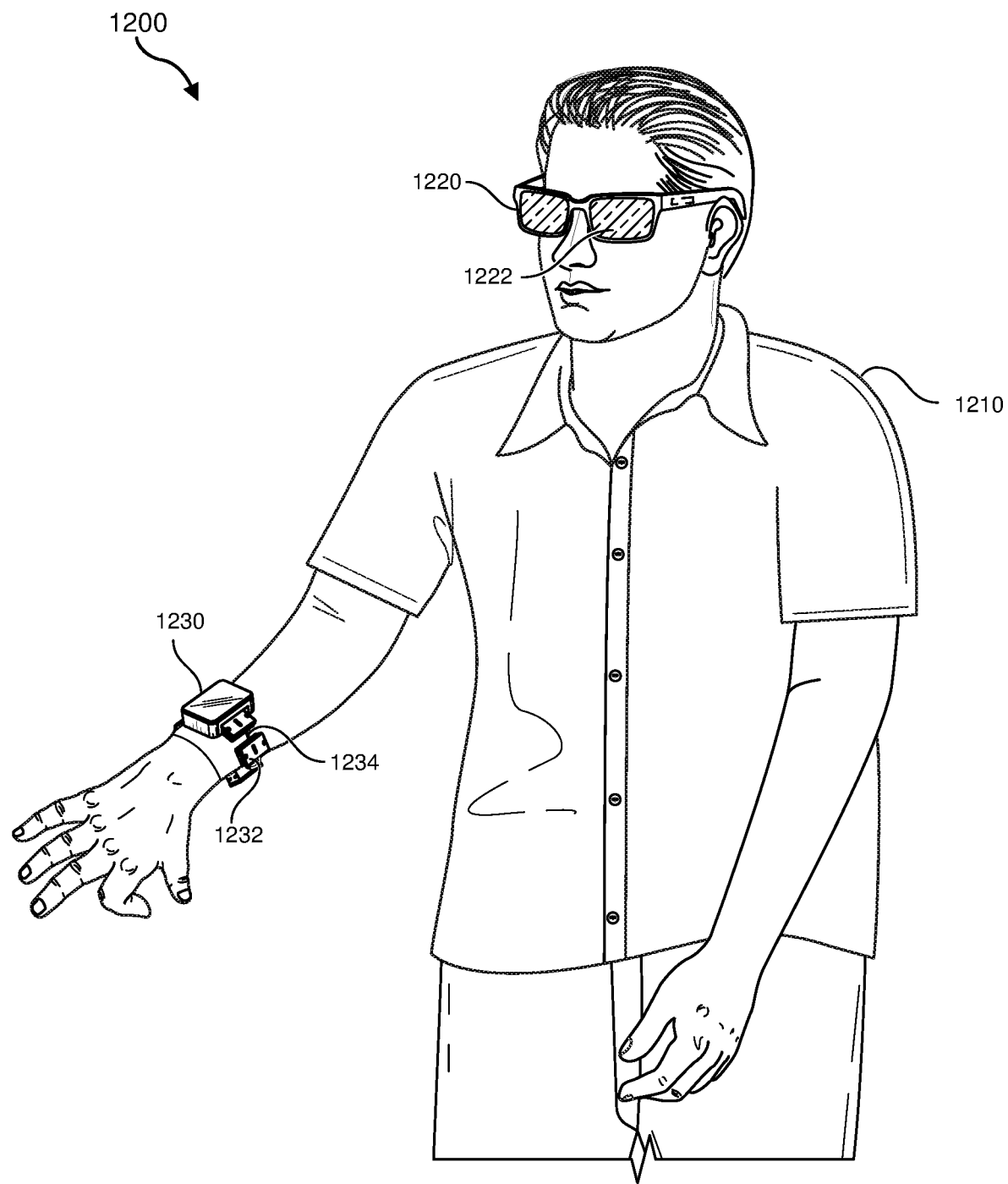
FIG. 12 is an illustration of an exemplary augmented-reality environment according to embodiments of this disclosure.

While haptic interfaces may be used with virtual-reality systems, as shown in FIG. 5, haptic interfaces may also be used with augmented-reality systems, as shown in FIG. 6. FIG. 12 is a perspective view a user 1210 interacting with an augmented-reality system 1200. In this example, user 1210 may wear a pair of augmented-reality glasses 1220 that have one or more displays 1222 and that are paired with a haptic device 1230. Haptic device 1230 may be a wristband that includes a plurality of band elements 1232 and a tensioning mechanism 1234 that connects band elements 1232 to one another.

One or more of band elements 1232 may include any type or form of actuator suitable for providing haptic feedback. For example, one or more of band elements 1232 may be configured to provide one or more of various types of cutaneous feedback, including vibration, force, traction, texture, and/or temperature. To provide such feedback, band elements 1232 may include one or more of various types of actuators. In one example, each of band elements 1232 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1010, 1020, 1104, and 1230 may include any suitable number and/or type of haptic transducer, sensor, and/or feedback mechanism. For example, haptic devices 1010, 1020, 1104, and 1230 may include one or more mechanical transducers, piezoelectric transducers, and/or fluidic transducers. Haptic devices 1010, 1020, 1104, and 1230 may also include various combinations of different types and forms of transducers that work together or independently to enhance a user's artificial-reality experience. In one example, each of band elements 1232 of haptic device 1230 may include a vibrotactor (e.g., a vibrotactile actuator) configured to vibrate in unison or independently to provide one or more of various types of haptic sensations to a user.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A haptic-jamming device, the device comprising:
   a first haptic-jamming member comprising a first element rotatable about an axis and a first elongated extension outwardly disposed from the first element in a first direction;
   a second haptic-jamming member comprising a second element rotatable about the axis and a second elongated extension outwardly disposed from the second element in a second direction; and
   a variable voltage source electrically coupled to at least one of the first haptic-jamming member or the second haptic-jamming member that, when energized, generates an electrostatic field encompassing at least one of the first or second elements to alter a distance between the first and second elements along the axis, wherein a level of resistance to rotation between the first and second elements is related to a strength of the electrostatic field and to a distance between the first and second elements along the axis.

2. The device of claim 1, wherein:
   at least one of the first or second elements comprises a piezoelectric material.

3. The device of claim 1, wherein at least one of the first element or the second element comprises a dielectric material disposed between two electrodes, the electrodes connected to the voltage source.

4. The device of claim 1, wherein a voltage from the variable voltage is varied by a pulse-width modulation signal to vary the strength of the electrostatic field.

5. The device of claim 1, wherein the axis is positioned to be located at a bodily joint of a user.

6. The device of claim 5, wherein the bodily joint comprises a carpometacarpal joint, a metacarpal joint, a proximal interphalangeal joint, or a distal interphalangeal joint.

7. The device of claim 1, wherein the first elongated extension is positioned such that the first direction is oriented along a digit phalanx of a user.

8. The device of claim 7, wherein the second haptic-jamming member is positioned such that the second direction is oriented along an adjacent digit phalanx of the user.

9. The device of claim 8, wherein the first elongated extension is positioned to be moveably disposed parallel to the digit phalanx and the second elongated extension is positioned to be moveably disposed parallel to the adjacent digit phalanx in relation to the electrostatic field.

10. A composite device to control the movements of a hand, the composite device comprising a haptic-jamming device according to claim 1 positioned to be located adjacent at least one of a carpometacarpal joint, a metacarpal joint, a proximal interphalangeal joint, or a distal interphalangeal joint of a user, wherein the voltage source of the haptic-jamming device is varied by a pulse-width modulation signal specific to the at least one of the carpometacarpal joint, the metacarpal joint, the proximal interphalangeal joint, or the distal interphalangeal joint.

11. A method for providing haptic feedback to a user, the method comprising:
   generating, by a variable voltage source, an electrostatic field encompassing at least one of a first element of a first haptic-jamming member or a second element of a second haptic-jamming member, wherein:
      the first haptic-jamming member comprises the first element rotatable about an axis and a first elongated extension outwardly disposed in a first direction from the first element; and
      the second haptic-jamming member comprises the second element rotatable about the axis and a second elongated extension outwardly disposed in a second direction from the second element; and
   controlling a level of resistance to rotation between the first element of the first haptic-jamming member and the second element of the second haptic-jamming member comprises controlling a strength of the generated electrostatic field encompassing the at least one of the first element or the second element to alter a distance between the first and second elements along the axis.

12. The method of claim 11, wherein:
   at least one of the first or second elements comprises a piezoelectric material.

13. The method of claim 11, wherein at least one of the first element or the second element comprises a dielectric material disposed between two electrodes, the electrodes connected to the voltage source.

14. The method of claim 11, wherein a voltage from the variable voltage source is varied by a pulse-width modulation signal to vary the strength of the electrostatic field.

15. The method of claim 11, wherein the axis is positioned to be located at a bodily joint of a user.

16. The method of claim 15, wherein the bodily joint comprises a carpometacarpal joint, a metacarpal joint, a proximal interphalangeal joint, or a distal interphalangeal joint.

17. The method of claim 11, wherein:
the first elongated extension is positioned such that the first direction is oriented along a digit phalanx of a user; and
the second haptic-jamming member is positioned such that the second direction is oriented along an adjacent digit phalanx of the user.

18. The method of claim 17, wherein the first elongated extension is positioned to be moveably disposed parallel to the digit phalanx and the second elongated extension is positioned to be moveably disposed parallel to the adjacent digit phalanx in relation to the electrostatic field.

19. A wearable haptic article dimensioned to be worn on a user, the wearable haptic article comprising:
a haptic-jamming device that abuts a portion of a joint of a user when the wearable article is worn by the user, the haptic jamming device comprising:
a first haptic-jamming member comprising a first element rotatable about an axis and a first elongated extension outwardly disposed from the first element in a first direction;
a second haptic-jamming member comprising a second element rotatable about the axis and a second elongated extension outwardly disposed from the second element in a second direction; and
a variable voltage source that applies a voltage using pulse-width modulation to the haptic-jamming device to generate an electrostatic field encompassing at least one of the first or second elements to alter a distance between the first and second elements along the axis to control a level of resistance felt by the user upon rotating or attempting to rotate the joint.

20. The wearable haptic article of claim 19, wherein the article is a glove.

* * * * *